(12) United States Patent
Sarin et al.

(10) Patent No.: US 9,169,975 B2
(45) Date of Patent: Oct. 27, 2015

(54) SYSTEMS AND METHODS FOR MASS FLOW CONTROLLER VERIFICATION

(75) Inventors: Michael Christopher Sarin, Phoenix, AZ (US); Rafael Mendez, Phoenix, AZ (US); Gregory M. Bartlett, Phoenix, AZ (US); Eric Hill, Phoenix, AZ (US); Keith R. Lawson, Phoenix, AZ (US); Andy Rosser, Bristol (GB)

(73) Assignee: ASM IP Holding B.V., Almere (NL)

( * ) Notice: Subject to any disclaimer, the term of this patent is extended or adjusted under 35 U.S.C. 154(b) by 246 days.

(21) Appl. No.: 13/597,043

(22) Filed: Aug. 28, 2012

(65) Prior Publication Data

US 2014/0060147 A1    Mar. 6, 2014

(51) Int. Cl.
*G01F 25/00* (2006.01)
*F17D 1/00* (2006.01)

(52) U.S. Cl.
CPC *F17D 1/00* (2013.01); *G01F 25/00* (2013.01); *Y02E 60/34* (2013.01); *Y10T 137/0324* (2015.04); *Y10T 137/7722* (2015.04)

(58) Field of Classification Search
CPC .. G01F 25/0007; G01F 1/8436; G01F 1/8477
USPC .......................................................... 73/1.16
See application file for complete search history.

(56) References Cited

U.S. PATENT DOCUMENTS

| | | | |
|---|---|---|---|
| 2,745,640 A | 5/1956 | Cushman | |
| 2,990,045 A | 9/1959 | Root | |
| 3,833,492 A | 9/1974 | Bollyky | |
| 3,854,443 A | 12/1974 | Baerg | |
| 3,862,397 A | 1/1975 | Anderson et al. | |
| 3,887,790 A | 6/1975 | Ferguson | |
| 4,054,071 A | 10/1977 | Patejak | |
| 4,058,430 A | 11/1977 | Suntola et al. | |
| 4,145,699 A | 3/1979 | Hu et al. | |
| 4,176,630 A | 12/1979 | Elmer | |
| 4,181,330 A | 1/1980 | Kojima | |
| 4,194,536 A | 3/1980 | Stine et al. | |

(Continued)

FOREIGN PATENT DOCUMENTS

| | | |
|---|---|---|
| CN | 1563483 A | 1/2005 |
| CN | 101330015 | 12/2008 |

(Continued)

OTHER PUBLICATIONS

USPTO; Office Action dated Aug. 27, 2010 in U.S. Appl. No. 12/118,596.

(Continued)

*Primary Examiner* — Hezron E Williams
*Assistant Examiner* — Rodney T Frank
(74) *Attorney, Agent, or Firm* — Snell & Wilmer LLP

(57) ABSTRACT

A method and system are disclosed for verifying the flow rate of gas through a mass flow controller, such as a mass flow controller used with a tool for semiconductor or solar cell fabrication. To verify the mass flow rate measured by the mass flow controller, gas passing through the mass flow controller is also passed through a mass flow meter. The measured flow rate through the mass flow controller is compared to the measured flow rate through the mass flow meter and any difference between the two measured flow rates is determined. Depending upon the magnitude of any difference, the flow of gas to the mass flow controller may be altered.

34 Claims, 8 Drawing Sheets

(56) References Cited

U.S. PATENT DOCUMENTS

| | | | |
|---|---|---|---|
| 4,322,592 A | 3/1982 | Martin |
| 4,389,973 A | 6/1983 | Suntola et al. |
| 4,393,013 A | 7/1983 | McMenamin |
| 4,436,674 A | 3/1984 | McMenamin |
| 4,499,354 A | 2/1985 | Hill et al. |
| 4,512,113 A | 4/1985 | Budinger |
| 4,570,328 A | 2/1986 | Price et al. |
| D288,556 S | 3/1987 | Wallgren |
| 4,653,541 A | 3/1987 | Oehlschlaeger et al. |
| 4,722,298 A | 2/1988 | Rubin et al. |
| 4,735,259 A | 4/1988 | Vincent |
| 4,753,192 A | 6/1988 | Goldsmith et al. |
| 4,789,294 A | 12/1988 | Sato et al. |
| 4,821,674 A | 4/1989 | deBoer et al. |
| 4,827,430 A * | 5/1989 | Aid et al. ...................... 700/285 |
| 4,882,199 A | 11/1989 | Sadoway et al. |
| 4,986,215 A | 1/1991 | Yamada |
| 4,991,614 A | 2/1991 | Hammel |
| 5,062,386 A | 11/1991 | Christensen |
| 5,074,017 A | 12/1991 | Toya et al. |
| 5,119,760 A | 6/1992 | McMillan et al. |
| 5,167,716 A | 12/1992 | Boitnott et al. |
| 5,199,603 A | 4/1993 | Prescott |
| 5,221,556 A | 6/1993 | Hawkins et al. |
| 5,242,539 A | 9/1993 | Kumihashi et al. |
| 5,243,195 A | 9/1993 | Nishi |
| 5,326,427 A | 7/1994 | Jerbic |
| 5,380,367 A | 1/1995 | Bertone |
| 5,421,893 A | 6/1995 | Perlov |
| 5,422,139 A | 6/1995 | Shinriki et al. |
| 5,518,549 A | 5/1996 | Hellwig |
| 5,595,606 A | 1/1997 | Fujikawa et al. |
| 5,616,947 A | 4/1997 | Tamura |
| 5,632,919 A | 5/1997 | MacCracken et al. |
| 5,681,779 A | 10/1997 | Pasch et al. |
| 5,695,567 A | 12/1997 | Kordina |
| 5,730,801 A | 3/1998 | Tepman |
| 5,732,744 A | 3/1998 | Barr et al. |
| 5,736,314 A | 4/1998 | Hayes et al. |
| 5,796,074 A | 8/1998 | Edelstein et al. |
| 5,836,483 A | 11/1998 | Disel |
| 5,837,320 A | 11/1998 | Hampden-Smith et al. |
| 5,855,680 A | 1/1999 | Soininen et al. |
| 5,920,798 A | 7/1999 | Higuchi et al. |
| 5,979,506 A | 11/1999 | Aarseth |
| 6,013,553 A | 1/2000 | Wallace |
| 6,015,465 A | 1/2000 | Kholodenko et al. |
| 6,035,101 A | 3/2000 | Sajoto et al. |
| 6,060,691 A | 5/2000 | Minami et al. |
| 6,074,443 A | 6/2000 | Venkatesh |
| 6,083,321 A | 7/2000 | Lei et al. |
| 6,086,677 A | 7/2000 | Umotoy et al. |
| 6,122,036 A | 9/2000 | Yamasaki et al. |
| 6,125,789 A | 10/2000 | Gupta et al. |
| 6,129,044 A | 10/2000 | Zhao et al. |
| 6,148,761 A | 11/2000 | Majewski et al. |
| 6,160,244 A | 12/2000 | Ohashi |
| 6,161,500 A | 12/2000 | Kopacz et al. |
| 6,201,999 B1 | 3/2001 | Jevtic |
| 6,274,878 B1 | 8/2001 | Li et al. |
| 6,287,965 B1 | 9/2001 | Kang et al. |
| 6,302,964 B1 | 10/2001 | Umotoy et al. |
| 6,312,525 B1 | 11/2001 | Bright et al. |
| D451,893 S | 12/2001 | Robson |
| D452,220 S | 12/2001 | Robson |
| 6,326,597 B1 | 12/2001 | Lubomirsky et al. |
| 6,342,427 B1 | 1/2002 | Choi et al. |
| 6,367,410 B1 | 4/2002 | Leahey et al. |
| 6,368,987 B1 | 4/2002 | Kopacz et al. |
| 6,383,566 B1 | 5/2002 | Zagdoun |
| 6,410,459 B2 | 6/2002 | Blalock et al. |
| 6,420,279 B1 | 7/2002 | Ono et al. |
| 6,454,860 B2 | 9/2002 | Metzner et al. |
| 6,478,872 B1 | 11/2002 | Chae et al. |
| 6,482,331 B2 | 11/2002 | Lu et al. |
| 6,483,989 B1 | 11/2002 | Okada et al. |
| 6,511,539 B1 | 1/2003 | Raaijmakers |
| 6,521,295 B1 | 2/2003 | Remington |
| 6,534,395 B2 | 3/2003 | Werkhoven et al. |
| 6,569,239 B2 | 5/2003 | Arai et al. |
| 6,579,833 B1 | 6/2003 | McNallan et al. |
| 6,590,251 B2 | 7/2003 | Kang et al. |
| 6,594,550 B1 | 7/2003 | Okrah |
| 6,598,559 B1 | 7/2003 | Vellore et al. |
| 6,627,503 B2 | 9/2003 | Ma et al. |
| 6,633,364 B2 | 10/2003 | Hayashi |
| 6,645,304 B2 | 11/2003 | Yamaguchi |
| 6,648,974 B1 | 11/2003 | Ogliari et al. |
| 6,673,196 B1 | 1/2004 | Oyabu |
| 6,682,973 B1 | 1/2004 | Paton et al. |
| 6,709,989 B2 | 3/2004 | Ramdani et al. |
| 6,710,364 B2 | 3/2004 | Guldi et al. |
| 6,734,090 B2 | 5/2004 | Agarwala et al. |
| 6,820,570 B2 | 11/2004 | Kilpela et al. |
| 6,821,910 B2 | 11/2004 | Adomaitis et al. |
| 6,824,665 B2 | 11/2004 | Shipley et al. |
| 6,847,014 B1 | 1/2005 | Benjamin et al. |
| 6,858,524 B2 | 2/2005 | Haukka et al. |
| 6,858,547 B2 | 2/2005 | Metzner |
| 6,863,019 B2 | 3/2005 | Shamouilian |
| 6,874,480 B1 * | 4/2005 | Ismailov ...................... 123/494 |
| 6,875,677 B1 | 4/2005 | Conley, Jr. et al. |
| 6,884,066 B2 | 4/2005 | Nguyen et al. |
| 6,884,319 B2 | 4/2005 | Kim |
| 6,889,864 B2 | 5/2005 | Lindfors et al. |
| 6,909,839 B2 | 6/2005 | Wang et al. |
| 6,930,059 B2 | 8/2005 | Conley, Jr. et al. |
| 6,935,269 B2 | 8/2005 | Lee et al. |
| 6,955,836 B2 | 10/2005 | Kumagai et al. |
| 6,972,478 B1 | 12/2005 | Waite et al. |
| 7,045,430 B2 | 5/2006 | Ahn et al. |
| 7,053,009 B2 | 5/2006 | Conley, Jr. et al. |
| 7,071,051 B1 | 7/2006 | Jeon et al. |
| 7,115,838 B2 | 10/2006 | Kurara et al. |
| 7,122,085 B2 | 10/2006 | Shero et al. |
| 7,129,165 B2 | 10/2006 | Basol et al. |
| 7,132,360 B2 | 11/2006 | Schaeffer et al. |
| 7,135,421 B2 | 11/2006 | Ahn et al. |
| 7,147,766 B2 | 12/2006 | Uzoh et al. |
| 7,172,497 B2 | 2/2007 | Basol et al. |
| 7,192,824 B2 | 3/2007 | Ahn et al. |
| 7,192,892 B2 | 3/2007 | Ahn et al. |
| 7,195,693 B2 | 3/2007 | Cowans |
| 7,204,887 B2 | 4/2007 | Kawamura et al. |
| 7,205,247 B2 | 4/2007 | Lee et al. |
| 7,235,501 B2 | 6/2007 | Ahn et al. |
| 7,238,596 B2 | 7/2007 | Kouvetakis et al. |
| D553,104 S | 10/2007 | Oohashi et al. |
| 7,298,009 B2 | 11/2007 | Yan et al. |
| D557,226 S | 12/2007 | Uchino et al. |
| 7,312,494 B2 | 12/2007 | Ahn et al. |
| 7,329,947 B2 | 2/2008 | Adachi et al. |
| 7,357,138 B2 | 4/2008 | Ji et al. |
| 7,393,418 B2 | 7/2008 | Yokogawa |
| 7,393,736 B2 | 7/2008 | Ahn et al. |
| 7,402,534 B2 | 7/2008 | Mahajani |
| 7,405,166 B2 | 7/2008 | Liang et al. |
| 7,405,454 B2 | 7/2008 | Ahn et al. |
| 7,414,281 B1 | 8/2008 | Fastow |
| 7,431,966 B2 | 10/2008 | Derderian et al. |
| 7,437,060 B2 | 10/2008 | Wang et al. |
| 7,442,275 B2 | 10/2008 | Cowans |
| 7,489,389 B2 | 2/2009 | Shibazaki |
| D593,969 S | 6/2009 | Li |
| 7,547,363 B2 | 6/2009 | Tomiyasu et al. |
| 7,575,968 B2 | 8/2009 | Sadaka et al. |
| 7,589,003 B2 | 9/2009 | Kouvetakis et al. |
| 7,601,223 B2 | 10/2009 | Lindfors et al. |
| 7,601,225 B2 | 10/2009 | Tuominen et al. |
| 7,640,142 B2 | 12/2009 | Tachikawa et al. |
| 7,651,583 B2 | 1/2010 | Kent et al. |
| D609,655 S | 2/2010 | Sugimoto |
| 7,678,197 B2 | 3/2010 | Maki |
| D614,153 S | 4/2010 | Fondurulia et al. |

(56) References Cited

U.S. PATENT DOCUMENTS

| | | |
|---|---|---|
| 7,720,560 B2 | 5/2010 | Menser et al. |
| 7,723,648 B2 | 5/2010 | Tsukamoto et al. |
| 7,740,705 B2 | 6/2010 | Li |
| 7,780,440 B2 | 8/2010 | Shibagaki et al. |
| 7,833,353 B2 | 11/2010 | Furukawahara et al. |
| 7,838,084 B2 | 11/2010 | Derderian et al. |
| 7,851,019 B2 | 12/2010 | Tuominen et al. |
| 7,884,918 B2 | 2/2011 | Hattori |
| D634,719 S | 3/2011 | Yasuda et al. |
| 8,041,197 B2 | 10/2011 | Kasai et al. |
| 8,055,378 B2 | 11/2011 | Numakura |
| 8,071,451 B2 | 12/2011 | Berry |
| 8,071,452 B2 | 12/2011 | Raisanen |
| 8,072,578 B2 | 12/2011 | Yasuda |
| 8,076,230 B2 | 12/2011 | Wei |
| 8,076,237 B2 | 12/2011 | Uzoh |
| 8,082,946 B2 | 12/2011 | Laverdiere et al. |
| 8,092,604 B2 | 1/2012 | Tomiyasu et al. |
| 8,137,462 B2 | 3/2012 | Fondurulia et al. |
| 8,147,242 B2 | 4/2012 | Shibagaki et al. |
| 8,216,380 B2 | 7/2012 | White et al. |
| 8,278,176 B2 | 10/2012 | Bauer et al. |
| 8,282,769 B2 | 10/2012 | Iizuka |
| 8,287,648 B2 | 10/2012 | Reed et al. |
| 8,293,016 B2 | 10/2012 | Bahng et al. |
| 8,309,173 B2 | 11/2012 | Tuominen et al. |
| 8,323,413 B2 | 12/2012 | Son |
| 8,367,528 B2 | 2/2013 | Bauer et al. |
| 8,372,204 B2 | 2/2013 | Nakamura |
| 8,444,120 B2 | 5/2013 | Gregg et al. |
| 8,506,713 B2 | 8/2013 | Takagi |
| D691,974 S | 10/2013 | Osada et al. |
| 8,608,885 B2 | 12/2013 | Goto et al. |
| 8,683,943 B2 | 4/2014 | Onodera et al. |
| 8,711,338 B2 | 4/2014 | Liu et al. |
| D705,745 S | 5/2014 | Kurs et al. |
| 8,726,837 B2 | 5/2014 | Patalay et al. |
| 8,728,832 B2 | 5/2014 | Raisanen et al. |
| 8,802,201 B2 | 8/2014 | Raisanen et al. |
| D716,742 S | 11/2014 | Jang et al. |
| 8,877,655 B2 | 11/2014 | Shero et al. |
| 8,883,270 B2 | 11/2014 | Shero et al. |
| 8,986,456 B2 | 3/2015 | Fondurulia et al. |
| 8,993,054 B2 | 3/2015 | Jung et al. |
| 9,005,539 B2 | 4/2015 | Halpin et al. |
| 9,017,481 B1 | 4/2015 | Pettinger et al. |
| 9,018,111 B2 | 4/2015 | Milligan et al. |
| 9,021,985 B2 | 5/2015 | Alokozai et al. |
| 9,029,253 B2 | 5/2015 | Milligan et al. |
| 9,096,931 B2 | 8/2015 | Yednak et al. |
| 2001/0017103 A1 | 8/2001 | Takeshita et al. |
| 2001/0046765 A1 | 11/2001 | Cappellani et al. |
| 2002/0001974 A1 | 1/2002 | Chan |
| 2002/0011210 A1 | 1/2002 | Satoh et al. |
| 2002/0064592 A1 | 5/2002 | Datta et al. |
| 2002/0098627 A1 | 7/2002 | Pomarede et al. |
| 2002/0108670 A1 | 8/2002 | Baker et al. |
| 2002/0115252 A1 | 8/2002 | Haukka et al. |
| 2002/0172768 A1 | 11/2002 | Endo et al. |
| 2002/0187650 A1 | 12/2002 | Blalock et al. |
| 2003/0019580 A1 | 1/2003 | Strang |
| 2003/0025146 A1 | 2/2003 | Narwankar et al. |
| 2003/0040158 A1 | 2/2003 | Saitoh |
| 2003/0042419 A1 | 3/2003 | Katsumata et al. |
| 2003/0066826 A1 | 4/2003 | Lee et al. |
| 2003/0075925 A1 | 4/2003 | Lindfors et al. |
| 2003/0094133 A1 | 5/2003 | Yoshidome et al. |
| 2003/0111963 A1 | 6/2003 | Tolmachev et al. |
| 2003/0141820 A1 | 7/2003 | White et al. |
| 2003/0168001 A1 | 9/2003 | Sneh |
| 2003/0180458 A1 | 9/2003 | Sneh |
| 2003/0228772 A1 | 12/2003 | Cowans |
| 2003/0232138 A1 | 12/2003 | Tuominen et al. |
| 2004/0009679 A1 | 1/2004 | Yeo et al. |
| 2004/0013577 A1 | 1/2004 | Ganguli et al. |
| 2004/0018307 A1 | 1/2004 | Park et al. |
| 2004/0018750 A1 | 1/2004 | Sophie et al. |
| 2004/0023516 A1 | 2/2004 | Londergan et al. |
| 2004/0036129 A1 | 2/2004 | Forbes et al. |
| 2004/0077182 A1 | 4/2004 | Lim et al. |
| 2004/0101622 A1 | 5/2004 | Park et al. |
| 2004/0106249 A1 | 6/2004 | Huotari |
| 2004/0144980 A1 | 7/2004 | Ahn et al. |
| 2004/0168627 A1 | 9/2004 | Conley et al. |
| 2004/0169032 A1 | 9/2004 | Murayama et al. |
| 2004/0198069 A1 | 10/2004 | Metzner et al. |
| 2004/0200499 A1 | 10/2004 | Harvey et al. |
| 2004/0219793 A1 | 11/2004 | Hishiya et al. |
| 2004/0221807 A1 | 11/2004 | Verghese et al. |
| 2004/0266011 A1 | 12/2004 | Lee et al. |
| 2005/0008799 A1 | 1/2005 | Tomiyasu et al. |
| 2005/0019026 A1 | 1/2005 | Wang et al. |
| 2005/0020071 A1 | 1/2005 | Sonobe et al. |
| 2005/0023624 A1 | 2/2005 | Ahn et al. |
| 2005/0054228 A1 | 3/2005 | March |
| 2005/0066893 A1 | 3/2005 | Soininen |
| 2005/0070123 A1 | 3/2005 | Hirano |
| 2005/0072357 A1 | 4/2005 | Shero |
| 2005/0092249 A1 | 5/2005 | Kilpela et al. |
| 2005/0100669 A1 | 5/2005 | Kools et al. |
| 2005/0106893 A1 | 5/2005 | Wilk |
| 2005/0110069 A1 | 5/2005 | Kil et al. |
| 2005/0123690 A1 | 6/2005 | Derderian et al. |
| 2005/0173003 A1 | 8/2005 | Laverdiere et al. |
| 2005/0187647 A1 | 8/2005 | Wang et al. |
| 2005/0212119 A1 | 9/2005 | Shero et al. |
| 2005/0214457 A1 | 9/2005 | Schmitt et al. |
| 2005/0214458 A1 | 9/2005 | Meiere |
| 2005/0218462 A1 | 10/2005 | Ahn et al. |
| 2005/0229848 A1 | 10/2005 | Shinriki |
| 2005/0229972 A1 | 10/2005 | Hoshi et al. |
| 2005/0241176 A1 | 11/2005 | Shero et al. |
| 2005/0263075 A1 | 12/2005 | Wang et al. |
| 2005/0271813 A1 | 12/2005 | Kher et al. |
| 2005/0282101 A1 | 12/2005 | Adachi |
| 2005/0287725 A1 | 12/2005 | Kitagawa |
| 2006/0013946 A1 | 1/2006 | Park et al. |
| 2006/0014384 A1 | 1/2006 | Lee et al. |
| 2006/0019033 A1 | 1/2006 | Muthukrishnan et al. |
| 2006/0024439 A2 | 2/2006 | Tuominen et al. |
| 2006/0046518 A1 | 3/2006 | Hill et al. |
| 2006/0051925 A1 | 3/2006 | Ahn et al. |
| 2006/0060930 A1 | 3/2006 | Metz et al. |
| 2006/0062910 A1 | 3/2006 | Meiere |
| 2006/0063346 A1 | 3/2006 | Lee et al. |
| 2006/0068125 A1 | 3/2006 | Radhakrishnan |
| 2006/0110934 A1 | 5/2006 | Fukuchi |
| 2006/0113675 A1 | 6/2006 | Chang et al. |
| 2006/0128168 A1 | 6/2006 | Ahn et al. |
| 2006/0148180 A1 | 7/2006 | Ahn et al. |
| 2006/0163612 A1 | 7/2006 | Kouvetakis et al. |
| 2006/0193979 A1 | 8/2006 | Meiere et al. |
| 2006/0208215 A1 | 9/2006 | Metzner et al. |
| 2006/0213439 A1 | 9/2006 | Ishizaka |
| 2006/0223301 A1 | 10/2006 | Vanhaelemeersch et al. |
| 2006/0226117 A1 | 10/2006 | Bertram et al. |
| 2006/0228888 A1 | 10/2006 | Lee et al. |
| 2006/0240574 A1 | 10/2006 | Yoshie |
| 2006/0257563 A1 | 11/2006 | Doh et al. |
| 2006/0257584 A1 | 11/2006 | Derderian et al. |
| 2006/0258078 A1 | 11/2006 | Lee et al. |
| 2006/0266289 A1 | 11/2006 | Verghese et al. |
| 2007/0010072 A1 | 1/2007 | Bailey et al. |
| 2007/0020953 A1 | 1/2007 | Tsai et al. |
| 2007/0022954 A1 | 2/2007 | Iizuka et al. |
| 2007/0028842 A1 | 2/2007 | Inagawa et al. |
| 2007/0031598 A1 | 2/2007 | Okuyama et al. |
| 2007/0031599 A1 | 2/2007 | Gschwandtner et al. |
| 2007/0037412 A1 | 2/2007 | Dip et al. |
| 2007/0042117 A1 | 2/2007 | Kupurao et al. |
| 2007/0049053 A1 | 3/2007 | Mahajani |
| 2007/0059948 A1 | 3/2007 | Metzner et al. |
| 2007/0065578 A1 | 3/2007 | McDougall |
| 2007/0066010 A1 | 3/2007 | Ando |

(56) References Cited

U.S. PATENT DOCUMENTS

| | | |
|---|---|---|
| 2007/0077355 A1 | 4/2007 | Chacin et al. |
| 2007/0084405 A1 | 4/2007 | Kim |
| 2007/0096194 A1 | 5/2007 | Streck et al. |
| 2007/0116873 A1 | 5/2007 | Li et al. |
| 2007/0134942 A1 | 6/2007 | Ahn et al. |
| 2007/0146621 A1 | 6/2007 | Yeom |
| 2007/0155138 A1 | 7/2007 | Tomasini et al. |
| 2007/0163440 A1 | 7/2007 | Kim et al. |
| 2007/0166457 A1 | 7/2007 | Yamoto et al. |
| 2007/0175397 A1 | 8/2007 | Tomiyasu et al. |
| 2007/0209590 A1 | 9/2007 | Li |
| 2007/0232501 A1 | 10/2007 | Tonomura |
| 2007/0237697 A1 | 10/2007 | Clark |
| 2007/0249131 A1 | 10/2007 | Allen et al. |
| 2007/0252244 A1 | 11/2007 | Srividya et al. |
| 2007/0264807 A1 | 11/2007 | Leone et al. |
| 2008/0006208 A1 | 1/2008 | Ueno et al. |
| 2008/0029790 A1 | 2/2008 | Ahn et al. |
| 2008/0054332 A1 | 3/2008 | Kim et al. |
| 2008/0057659 A1 | 3/2008 | Forbes et al. |
| 2008/0075881 A1 | 3/2008 | Won et al. |
| 2008/0085226 A1 | 4/2008 | Fondurulia et al. |
| 2008/0113096 A1 | 5/2008 | Mahajani |
| 2008/0113097 A1 | 5/2008 | Mahajani et al. |
| 2008/0124908 A1 | 5/2008 | Forbes et al. |
| 2008/0149031 A1 | 6/2008 | Chu et al. |
| 2008/0176375 A1 | 7/2008 | Erben et al. |
| 2008/0216077 A1 | 9/2008 | Emani et al. |
| 2008/0224240 A1 | 9/2008 | Ahn et al. |
| 2008/0233288 A1 | 9/2008 | Clark |
| 2008/0237572 A1 | 10/2008 | Chui et al. |
| 2008/0248310 A1 | 10/2008 | Kim et al. |
| 2008/0261413 A1 | 10/2008 | Mahajani |
| 2008/0282970 A1 | 11/2008 | Heys et al. |
| 2008/0315292 A1 | 12/2008 | Ji et al. |
| 2009/0000550 A1 | 1/2009 | Tran et al. |
| 2009/0011608 A1 | 1/2009 | Nabatame |
| 2009/0020072 A1 | 1/2009 | Mizunaga et al. |
| 2009/0029564 A1 | 1/2009 | Yamashita et al. |
| 2009/0035947 A1 | 2/2009 | Horii |
| 2009/0061644 A1 | 3/2009 | Chiang et al. |
| 2009/0085156 A1 | 4/2009 | Dewey et al. |
| 2009/0093094 A1 | 4/2009 | Ye et al. |
| 2009/0095221 A1 | 4/2009 | Tam et al. |
| 2009/0107404 A1 | 4/2009 | Ogliari et al. |
| 2009/0122293 A1 | 5/2009 | Shibazaki |
| 2009/0136668 A1 | 5/2009 | Gregg et al. |
| 2009/0139657 A1 | 6/2009 | Lee et al. |
| 2009/0211523 A1 | 8/2009 | Kuppurao et al. |
| 2009/0211525 A1 | 8/2009 | Sarigiannis et al. |
| 2009/0239386 A1 | 9/2009 | Suzaki et al. |
| 2009/0242957 A1 | 10/2009 | Ma et al. |
| 2009/0246374 A1 | 10/2009 | Vukovic |
| 2009/0261331 A1 | 10/2009 | Yang et al. |
| 2009/0277510 A1 | 11/2009 | Shikata |
| 2009/0283041 A1 | 11/2009 | Tomiyasu et al. |
| 2009/0289300 A1 | 11/2009 | Sasaki et al. |
| 2010/0024727 A1 | 2/2010 | Kim et al. |
| 2010/0025796 A1 | 2/2010 | Dabiran |
| 2010/0055312 A1 | 3/2010 | Kato et al. |
| 2010/0075507 A1 | 3/2010 | Chang et al. |
| 2010/0102417 A1 | 4/2010 | Ganguli et al. |
| 2010/0124610 A1 | 5/2010 | Aikawa et al. |
| 2010/0130017 A1 | 5/2010 | Luo et al. |
| 2010/0162752 A1 | 7/2010 | Tabata et al. |
| 2010/0170441 A1 | 7/2010 | Won et al. |
| 2010/0193501 A1 | 8/2010 | Zucker et al. |
| 2010/0230051 A1 | 9/2010 | Iizuka |
| 2010/0255198 A1 | 10/2010 | Cleary et al. |
| 2010/0275846 A1 | 11/2010 | Kitagawa |
| 2010/0294199 A1 | 11/2010 | Tran et al. |
| 2010/0307415 A1 | 12/2010 | Shero et al. |
| 2010/0322604 A1 | 12/2010 | Fondurulia et al. |
| 2011/0000619 A1 | 1/2011 | Suh |
| 2011/0061810 A1 | 3/2011 | Ganguly et al. |
| 2011/0070380 A1 | 3/2011 | Shero et al. |
| 2011/0089469 A1 | 4/2011 | Merckling |
| 2011/0097901 A1 | 4/2011 | Banna et al. |
| 2011/0108194 A1 | 5/2011 | Yoshioka et al. |
| 2011/0236600 A1 | 9/2011 | Fox et al. |
| 2011/0239936 A1 | 10/2011 | Suzaki et al. |
| 2011/0254052 A1 | 10/2011 | Kouvetakis |
| 2011/0256734 A1 | 10/2011 | Hausmann et al. |
| 2011/0275166 A1 | 11/2011 | Shero et al. |
| 2011/0308460 A1 | 12/2011 | Hong et al. |
| 2012/0024479 A1 | 2/2012 | Palagashvili et al. |
| 2012/0070136 A1 | 3/2012 | Koelmel et al. |
| 2012/0070997 A1 | 3/2012 | Larson |
| 2012/0090704 A1 | 4/2012 | Laverdiere et al. |
| 2012/0098107 A1 | 4/2012 | Raisanen et al. |
| 2012/0114877 A1 | 5/2012 | Lee |
| 2012/0156108 A1 | 6/2012 | Fondurulia et al. |
| 2012/0160172 A1 | 6/2012 | Wamura et al. |
| 2012/0240858 A1 | 9/2012 | Taniyama et al. |
| 2012/0270393 A1 | 10/2012 | Pore et al. |
| 2012/0289053 A1 | 11/2012 | Holland et al. |
| 2012/0295427 A1 | 11/2012 | Bauer |
| 2012/0304935 A1 | 12/2012 | Oosterlaken et al. |
| 2012/0318334 A1 | 12/2012 | Bedell et al. |
| 2012/0321786 A1 | 12/2012 | Satitpunwaycha et al. |
| 2013/0023129 A1 | 1/2013 | Reed |
| 2013/0081702 A1* | 4/2013 | Mohammed et al. ............ 137/2 |
| 2013/0104988 A1 | 5/2013 | Yednak et al. |
| 2013/0104992 A1 | 5/2013 | Yednak et al. |
| 2013/0115383 A1 | 5/2013 | Lu et al. |
| 2013/0126515 A1 | 5/2013 | Shero et al. |
| 2013/0129577 A1 | 5/2013 | Halpin et al. |
| 2013/0230814 A1 | 9/2013 | Dunn et al. |
| 2013/0256838 A1 | 10/2013 | Sanchez et al. |
| 2013/0264659 A1 | 10/2013 | Jung |
| 2013/0292676 A1 | 11/2013 | Milligan et al. |
| 2013/0292807 A1 | 11/2013 | Raisanen et al. |
| 2013/0330911 A1 | 12/2013 | Huang et al. |
| 2014/0000843 A1 | 1/2014 | Dunn et al. |
| 2014/0014644 A1 | 1/2014 | Akiba et al. |
| 2014/0020619 A1 | 1/2014 | Vincent et al. |
| 2014/0027884 A1 | 1/2014 | Fang et al. |
| 2014/0036274 A1 | 2/2014 | Marquardt et al. |
| 2014/0060147 A1 | 3/2014 | Sarin et al. |
| 2014/0067110 A1 | 3/2014 | Lawson et al. |
| 2014/0073143 A1 | 3/2014 | Alokozai et al. |
| 2014/0077240 A1 | 3/2014 | Roucka et al. |
| 2014/0084341 A1 | 3/2014 | Weeks |
| 2014/0087544 A1 | 3/2014 | Tolle |
| 2014/0103145 A1 | 4/2014 | White et al. |
| 2014/0120487 A1 | 5/2014 | Kaneko |
| 2014/0159170 A1 | 6/2014 | Raisanen et al. |
| 2014/0175054 A1 | 6/2014 | Carlson et al. |
| 2014/0217065 A1 | 8/2014 | Winkler et al. |
| 2014/0220247 A1 | 8/2014 | Haukka et al. |
| 2014/0225065 A1 | 8/2014 | Rachmady et al. |
| 2014/0251953 A1 | 9/2014 | Winkler et al. |
| 2014/0251954 A1 | 9/2014 | Winkler et al. |
| 2014/0346650 A1 | 11/2014 | Raisanen et al. |
| 2015/0004316 A1 | 1/2015 | Thompson et al. |
| 2015/0014632 A1 | 1/2015 | Kim et al. |
| 2015/0024609 A1 | 1/2015 | Milligan et al. |
| 2015/0048485 A1 | 2/2015 | Tolle |
| 2015/0091057 A1 | 4/2015 | Xie et al. |
| 2015/0096973 A1 | 4/2015 | Dunn et al. |
| 2015/0132212 A1 | 5/2015 | Winkler et al. |
| 2015/0140210 A1 | 5/2015 | Jung et al. |
| 2015/0147877 A1 | 5/2015 | Jung |
| 2015/0167159 A1 | 6/2015 | Halpin et al. |
| 2015/0184291 A1 | 7/2015 | Alokozai et al. |
| 2015/0187568 A1 | 7/2015 | Pettinger et al. |

FOREIGN PATENT DOCUMENTS

| | | |
|---|---|---|
| CN | 101522943 | 9/2009 |
| CN | 101423937 | 9/2011 |
| EP | 2036600 | 3/2009 |
| JP | 07283149 | 10/1995 |
| JP | 08335558 | 12/1996 |

(56) References Cited

FOREIGN PATENT DOCUMENTS

| | | |
|---|---|---|
| JP | 2001342570 | 12/2001 |
| JP | 2004014952 A | 1/2004 |
| JP | 2004091848 | 3/2004 |
| JP | 2004538374 | 12/2004 |
| JP | 2005507030 | 3/2005 |
| JP | 2006186271 | 7/2006 |
| JP | 2008527748 | 7/2008 |
| TW | 1226380 | 1/2005 |
| TW | 200701301 A | 1/2007 |
| WO | 2006056091 A1 | 6/2006 |
| WO | 2006/078666 | 7/2006 |

OTHER PUBLICATIONS

USPTO; Office Action dated Feb. 15, 2011 in U.S. Appl. No. 12/118,596.
USPTO; Notice of Allowance dated Aug. 4, 2011 in U.S. Appl. No. 12/118,596.
USPTO; Notice of Allowance dated Jun. 16, 2011 in U.S. Appl. No. 12/430,751.
USPTO; Notice of Allowance dated Jul. 27, 2011 in U.S. Appl. No. 12/430,751.
USPTO; Office Action dated Apr. 23, 2013 in U.S. Appl. No. 12/763,037.
USPTO; Office Action dated Jan. 15, 2013 in U.S. Appl. No. 12/754,223.
USPTO; Office Action dated Feb. 26, 2013 in U.S. Appl. No. 12/754,223.
PCT; International Search report and Written Opinion dated Nov. 12, 2010 in Application No. PCT/US2010/030126.
PCT; International Search report and Written Opinion dated Jan. 12, 2011 in Application No. PCT/US2010/045368.
PCT; International Search report and Written Opinion dated Feb. 6, 2013 in Application No. PCT/US2012/065343.
PCT; International Search report and Written Opinion dated Feb. 13, 2013 in Application No. PCT/US2012/065347.
USPTO; Office Action dated Dec. 6, 2012 in U.S. Appl. No. 12/854,818.
USPTO; Office Action dated Jan. 10, 2013 in U.S. Appl. No. 13/339,609.
USPTO; Office Action dated Feb. 11, 2013 in U.S. Appl. No. 13/339,609.
Chinese Patent Office; Office Action dated Jan. 10, 2013 is U.S. Appl. No. 201080015699.9.
Chang et al. Small-Subthreshold-Swing and Low-Voltage Flexible Organic Thin-Film Transistors Which Use HfLaO as the Gate Dielectric; IEEE Electron Device Letters; Feb. 2009; 133-135; vol. 30, No. 2; IEEE Electron Device Society.
Maeng et al. Electrical properties of atomic layer disposition Hf02 and HfOxNy on Si substrates with various crystal orientations, Journal of the Electrochemical Society, 2008-04, p. H267-H271, vol. 155, No. 4, Department of Materials Science and Engineering, Pohang University of Science and Technology, Pohang, Korea.
Novaro et al. Theoretical Study on a Reaction Pathway of Ziegler-Natta-Type Catalysis, J. Chem. Phys. 68(5), Mar. 1, 1978 p. 2337-2351.
USPTO; Final Office Action dated Jul. 14, 2014 in U.S. Appl. No. 12/754,223.
USPTO; Notice of Allowance dated Jul. 3, 2014 in U.S. Appl. No. 13/102,980.
USPTO; Office Action dated Jun. 3, 2014 in U.S. Appl. No. 12/854,818.
USPTO; Non-Final Office Action dated Jul. 2, 2014 in U.S. Appl. No. 13/283,408.
USPTO; Non-Final Office Action dated Jul. 30, 2014 in U.S. Appl. No. 13/284,642.
USPTO; Office Action dated Jul. 31, 2014 in U.S. Appl. No. 13/411,271.
USPTO Final Office Action dated Jul. 8, 2014 in U.S. Appl. No. 13/439,528.
USPTO; Final Office Action dated Jun. 18, 2014 in U.S. Appl. No. 13/535,214.
USPTO; Non-Final Office Action dated Aug. 8, 2014 in U.S. Appl. No. 13/563,066.
USPTO; Non-Final Office Action dated Jul. 10, 2014 in U.S. Appl. No. 13/612,538.
USPTO; Non-Final Office Action dated Jun. 2, 2014 in U.S. Appl. No. 13/677,151.
USPTO; Notice of Allowance dated Aug. 13, 2014 in U.S. Appl. No. 13/784,362.
USPTO; Restriction Requirement dated Jun. 26, 2014 in U.S. Appl. No. 13/874,708.
USPTO; Non-Final Office Action dated May 29, 2014 in U.S. Appl. No. 14/183,187.
Chinese Patent Office; Notice on the Third Office Action dated Jul. 1, 2014 in Application No. 201080036764.6.
Taiwan Patent Office; Office Action dated Jul. 4, 2014 in Application No. 09/9110,511.
USPTO; Final Office Action dated Jun. 28, 2013 in U.S. Appl. No. 12/754,223.
USPTO; Office Action dated Feb. 25, 2014 in U.S. Appl. No. 12/754,223.
USPTO; Restriction Requirement dated Sep. 25, 2012 in U.S. Appl. No. 12/854,818.
USPTO; Final Office Action dated Mar. 13, 2013 in U.S. Appl. No. 12/854,818.
USPTO; Office Action dated Aug. 30, 2013 in U.S. Appl. No. 12/854,818.
USPTO; Final Office Action dated Mar. 26, 2014 in U.S. Appl. No. 12/854,818.
USPTO; Restriction Requirement dated May 8, 2013 in U.S. Appl. No. 13/102,980.
USPTO; Office Action dated Oct. 7, 2013 in U.S. Appl. No. 13/102,980.
USPTO; Final Office Action dated Mar. 25, 2014 in U.S. Appl. No. 13/102,980.
USPTO; Restriction Requirement dated Dec. 16, 2013 in U.S. Appl. No. 13/284,642.
USPTO; Restriction Requirement dated Apr. 21, 2014 in U.S. Appl. No. 13/284,642.
USPTO; Office Action dated Jan. 28, 2014 in U.S. Appl. No. 13/312,591.
USPTO; Final Office Action dated May 14, 2014 in U.S. Appl. No. 13/312,591.
USPTO; Final Office Action dated May 17, 2013 in U.S. Appl. No. 13/339,609.
USPTO; Office Action dated Aug. 29, 2013 in U.S. Appl. No. 13/339,609.
USPTO; Final Office Action dated Dec. 18, 2013 in U.S. Appl. No. 13/339,609.
USPTO; Notice of Allowance dated Apr. 7, 2014 in U.S. Appl. No. 13/339,609.
USPTO; Office Action dated Feb. 13, 2014 in U.S. Appl. No. 13/411,271.
USPTO; Restriction Requirement dated Oct. 29, 2013 in U.S. Appl. No. 13/439,258.
USPTO; Office Action dated Mar. 24, 2014 in U.S. Appl. No. 13/439,258.
USPTO; Office Action dated May 23, 2013 in U.S. Appl. No. 13/465,340.
USPTO; Final Office Action dated Oct. 30, 2013 in U.S. Appl. No. 13/465,340.
USPTO; Notice of Allowance dated Feb. 12, 2014 in U.S. Appl. No. 13/465,340.
USPTO; Office Action dated Dec. 20, 2013 in U.S. Appl. No. 13/535,214.
USPTO; Office Action dated Nov. 15, 2013 in U.S. Appl. No. 13/612,538.
USPTO; Office Action dated Apr. 24, 2014 in U.S. Appl. No. 13/784,362.
Chinese Patent Office; Notice on the First Office Action dated May 24, 2013 in Serial No. 201080036764.6.

(56) References Cited

OTHER PUBLICATIONS

Chinese Patent Office; Notice on the Second Office Action dated Jan. 2, 2014 in Serial No. 201080036764.6.
Japanese Patent Office; Office Action dated Dec. 25, 2014 in Serial No. 2012-504786.
USPTO; Final Office Action dated Aug. 12, 2015 in U.S. Appl. No. 12/754,223.
USPTO; Notice of Allowance dated Jul. 16, 2015 in U.S. Appl. No. 13/563,066.
USPTO; Notice of Allowance dated Aug. 4, 2015 in U.S. Appl. No. 13/677,133.
USPTO; Non-Final Office Action dated Jul. 30, 2015 in U.S. Appl. No. 13/941,216.
USPTO; Non-Final Office Action dated Jun. 29, 2015 in U.S. Appl. No. 13/966,782.
USPTO; Final Office Action dated Jul. 14, 2015 in U.S. Appl. No. 14/457,058.
USPTO; Notice of Allowance dated Jul. 6, 2015 in U.S. Appl. No. 29/447,298.
USPTO; Notice of Allowance dated Jan. 27, 2015 in U.S. Appl. No. 12/763,037.
USPTO; Final Office Action dated Jan. 29, 2015 in U.S. Appl. No. 13/283,408.
USPTO; Notice of Allowance dated Feb. 11, 2015 in U.S. Appl. No. 13/284,642.
USPTO; Final Office Action dated Jan. 16, 2015 in U.S. Appl. No. 13/411,271.
USPTO; Final Office Action dated Feb. 12, 2015 in U.S. Appl. No. 13/563,066.
Uspto; Non-Final Office Action dated Feb. 12, 2015 in U.S. Appl. No. 13/597,108.
USPTO; Notice of Allowance dated Feb. 26, 2015 in U.S. Appl. No. 13/677,151.
USPTO; Notice of Allowance dated Jan. 20, 2015 in U.S. Appl. No. 13/941,134.
USPTO; Non-Final Office Action dated Feb. 12, 2015 in U.S. Appl. No. 14/457,058.
USPTO; Non-Final Office Action dated Jan. 16, 2015 in U.S. Appl. No. 14/563,044.
Chinese Patent Office; Office Action dated Jan. 12, 2015 in Application No. 201080015699.9.
Chinese Patent Office; Notice on the Third Office Action dated Feb. 9, 2015 in Application No. 201110155056.
Japanese Patent Office; Office Action dated Dec. 1, 2014 in Application No. 2012-504786.
Taiwan Patent Office; Office Action dated Dec. 30, 2014 in Application No. 099114330.
Taiwan Patent Office; Office Action dated Dec. 19, 2014 in Application No. 099127063.
USPTO; Office Action dated Oct. 8, 2014 in U.S. Appl. No. 12/763,037.
USPTO; Non-Final Office Action dated Sep. 17, 2014 in U.S. Appl. No. 13/187,300.
USPTO; Non-Final Office Action dated Nov. 26, 2014 in U.S. Appl. No. 13/312,591.
UPPTO; Notice of Allowance dated Oct. 21, 2014 in U.S. Appl. No. 13/439,528.
USPTO; Notice of Allowance dated Oct. 23, 2014 in U.S. Appl. No. 13/535,214.
USPTO; Non-Final Office Action dated Oct. 15, 2014 in U.S. Appl. No. 13/597,043.
USPTO; Final Office Action dated Nov. 14, 2014 in U.S. Appl. No. 13/677,151.
USPTO; Non-Final Office Action dated Oct. 9, 2014 in U.S. Appl. No. 13/874,708.
USPTO; Non-Final Office Action dated Sep. 19, 2014 in U.S. Appl. No. 13/791,246.
USPTO; Non-Final Office Action dated Sep. 12, 2014 in U.S. Appl. No. 13/941,134.
USPTO; Restriction Requirement dated Sep. 16, 2014 in U.S. Appl. No. 13/948,055.
USPTO; Non-Final Office Action dated Oct. 30, 2014 in U.S. Appl. No. 13/948,055.
USPTO; Final Office Action dated Nov. 7, 2014 in U.S. Appl. No. 14/183,187.
Chinese Patent Office; Notice on the Second Office Action dated Sep. 16, 2014 in Application No. 201110155056.
Koutsokeras et al. Texture and Microstructure Evolution in Single-Phase TixTal-xN Alloys of Rocksalt Structure. Journal of Applied Physics, 110, pp. 043535-1-043535-6, (2011).
USPTO; Final Office Action dated Apr. 15, 2015 in U.S. Appl. No. 13/187,300.
USPTO; Non-Final Office Action dated Jun. 17, 2015 in U.S. Appl. No. 13/283,408.
USPTO; Final Office Action dated Mar. 20, 2015 in U.S. Appl. No. 13/312,591.
USPTO; Notice of Allowance dated May 14, 2015 in U.S. Appl. No. 13/312,591.
USPTO; Notice of Allowance dated Jun. 12, 2015 in U.S. Appl. No. 13/563,066.
USPTO; Final Office Action dated Jun. 1, 2015 in U.S. Appl. No. 13/597,108.
USPTO; Final Office Action dated Mar. 13, 2015 in U.S. Appl. No. 13/597,043.
USPTO; Non-Final Office Action dated May 28, 2015 in U.S. Appl. No. 13/651,144.
USPTO; Non-Final Office Action dated Apr. 3, 2015 in U.S. Appl. No. 13/677,133.
USPTO; Final Office Action dated Mar. 25, 2015 in U.S. Appl. No. 13/791,246.
USPTO; Notice of Allowance dated Mar. 10, 2015 in U.S. Appl. No. 13/874,708.
USPTO; Restriction Requirement dated Apr. 30, 2015 in U.S. Appl. No. 13/941,216.
USPTO; Non-Final Office Action dated Apr. 7, 2015 in U.S. Appl. No. 14/018,345.
USPTO; Non-Final Office Action dated Apr. 28, 2015 in U.S. Appl. No. 14/040,196.
USPTO; Non-Final Office Action dated Mar. 19, 2015 in U.S. Appl. No. 14/079,302.
USPTO; Non-Final Office Action dated Mar. 19, 2015 in U.S. Appl. No. 14/166,462.
USPTO; Non-Final Office Action dated Mar. 16, 2015 in U.S. Appl. No. 14/183,187.
USPTO; Non-Final Office Action dated Mar. 16, 2015 in U.S. Appl. No. 29/447,298.
Bearzotti, et al., "Fast Humidity Response of a Metal Halide-Doped Novel Polymer," Sensors and Actuators B, 7, pp. 451-454, (1992).
Crowell, "Chemical Methods of Thin Film Deposition: Chemical Vapor Deposition, Atomic layer Deposition, and Related Technologies," Journal of Vacuum Science & Technology A 21.5, (2003): S88-S95.
Varma, et al., "Effect of Metal Halides on Thermal, Mechanical, and Electrical Properties of Polypyromelitimide Films," Journal of Applied Polymer Science, vol. 32, pp. 3987-4000, (1986).

* cited by examiner

SYSTEMS AND METHODS FOR MASS FLOW CONTROLLER VERIFICATION

Embodiments of the present application relate to systems and methods for verifying the measured gas flow through a mass flow controller, particularly a mass flow controller used in semiconductor fabrication.

BACKGROUND

In semiconductor fabrication, a substrate or wafer is subjected to a number of processes in order to deposit or remove a layer from the wafer. Many of these processes involve the introduction of gases into a reaction chamber containing the wafer. These gases can include, for example, reactive gases introduced to deposit a layer on the substrate. In addition, inert gases can also be introduced to purge reactive gases from the chamber between reactive steps. Systems for introducing gases generally include gas sources (such as gas tanks, bubblers, other liquid and/or solid vaporization devices) connected via piping ultimately to the reaction chamber. Mass flow controllers and valves are adjusted in order to select the type and amount of the desired source gas(es) to introduce into the reaction chamber. Each mass flow controller ("MFC") is normally calibrated to measure the flow rate of a particular type of process gas at a particular, flow rate or range of flow rates.

Semiconductor manufacturers have a continuing need to improve process accuracy and repeatability, both on a single tool, and across all tools in a fabrication operation running the same process. Deviations are caused by many factors, but a prime cause of deviation is the accuracy and repeatability of process gas flows controlled by MFCs. Any deviation from the idealized perfect flow for a particular process (caused by an inaccurate MFC, for example) can cause loss of yield and increased costs, and can affect the quality of the finished semiconductor. An MFC whose actual flow rate deviates from its intended flow rate (this deviation is sometimes referred to as "drift") must be recalibrated or replaced, which leads to tool down time, decreased output and increased costs.

Some digitally controlled MFCs have accuracy levels reportedly in the range of +/−1% of the desired flow rate when the MFC is new. Devices such as MFVs (mass flow verifiers) or MFMs (mass flow meters) can be used to monitor and verify that the amount of gas entering a tool as measured by an MFC is the actual amount entering the tool, i.e., they verify the MFCs accuracy. MFVs generally have an accuracy of +/−1% and can be used to monitor and verify whether the amount the gas flow rate measured by an MFC has deviated from the actual gas flow through the MFC. However, MFV use is very time consuming, taking up to several days to perform a complete verification. Such a verification is typically performed quarterly, thus not always detecting MFC deviations early enough to avoid the afore-mentioned problems with drift.

MFMs can also be used to monitor MFC drift and can detect drift much faster. MFCs and MFMs, however, are configured for a particular gas type and a particular flow rate range. It is impractical to include a duplicately configured MFM for each gas type and flow rate range for which each MFC is configured.

There also has not been a way to improve the accuracy of many tools in a process fabrication using these validation tools, but only the tool within which the MFM or MFV resides.

A method to verify the actual gas flow through an MFC and reduce process deviation caused by MFC variability, whether for a single tool or from tool to tool within a semiconductor fabrication facility, is highly desired.

SUMMARY

Embodiments of the present application help verify the accuracy of the measured gas flow through a MFC. Embodiments of the application also allow replacement MFCs to be quickly tested by an MFM prior to installation on a tool, and the gas flow through the MFC verified and calibrated if necessary. Thus, replacement of MFCs would be less likely to cause process deviation. Additionally, some embodiments may operate in conjunction with a reference MFM that can be used on multiple processing tools and multiple MFCS. Among other things, this allows MFMs resident on each tool to be aligned to the "reference" MFM and thereby improve tool to tool matching.

Exemplary methods and systems according to various aspects of the application may use a single MFM for one MFC or a plurality of MFCs. The method and system preferably include either (a) one MFM used to verify the flow rates for the MFCs for a particular tool, (b) one MFM used to verify the flow rates for MFCs for a plurality of tools, or (c) in a fabrication shop in which multiple tools are running the same process, one MFM can verify the flow rate on each MFC flowing a particular type of gas, regardless of which tool to which each MFC is connected. If one MFM is used to verify the measured gas flow rates for the MFCs for a plurality of tools, the MFCs could each be in fluid communication with the MFM, or the MFM could be moved from tool to tool. Additionally, a single MFM could be used to measure only the same process gas for different MFCs used on different tools. Adjustments to the gas flow rate through an MFC can be made manually, or can be made automatically through a module controller.

BRIEF DESCRIPTION OF THE DRAWINGS

A more complete understanding of the embodiments of the present disclosure may be derived by referring to the detailed description and claims when considered in connection with the following illustrative figures.

DETAILED DESCRIPTION OF EXEMPLARY EMBODIMENTS

Figure 1:
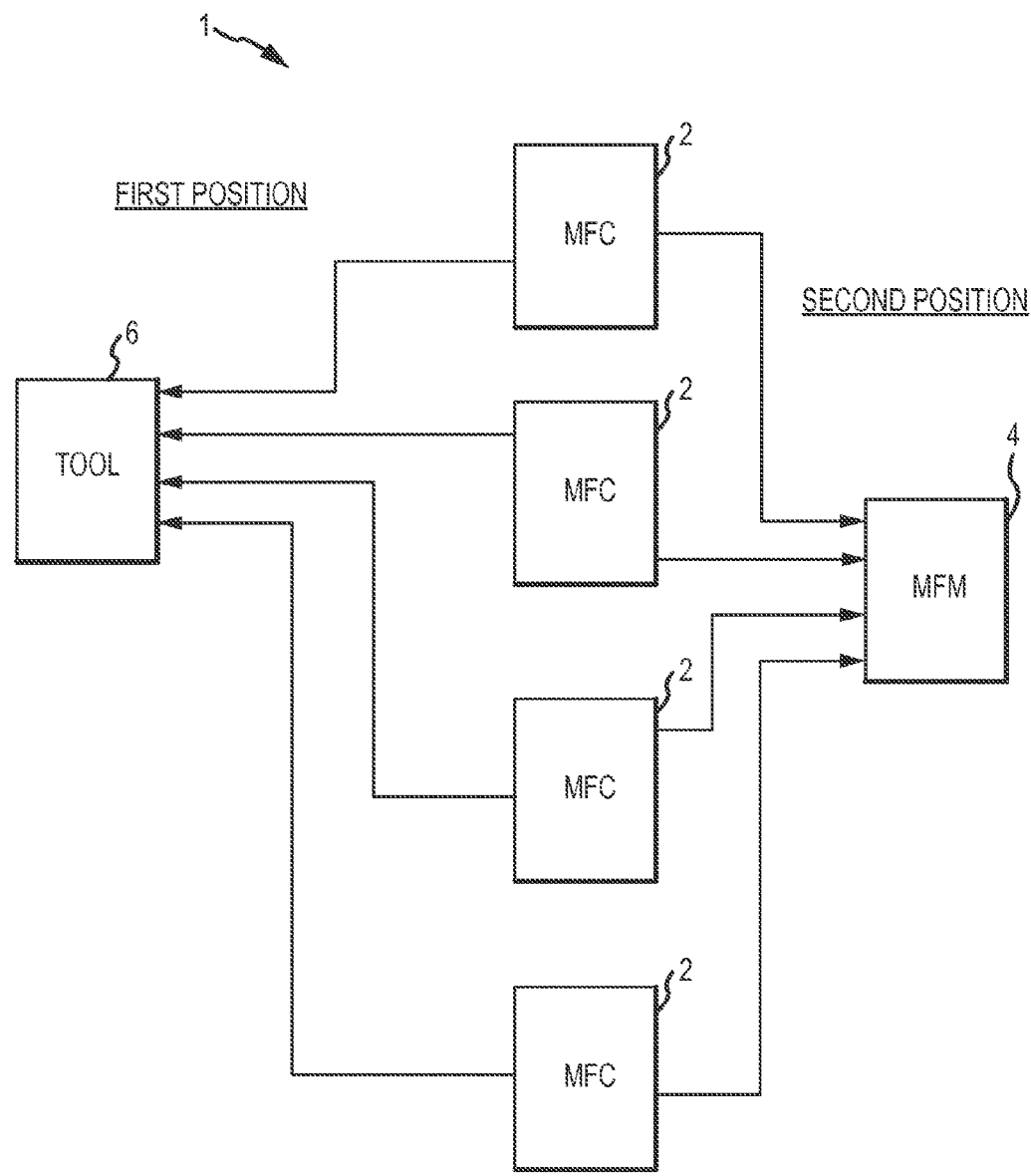
FIG. 1 is a block diagram of a system according to embodiments of the present disclosure.

Embodiments of the present disclosure relate to methods and systems for verifying and potentially adjusting the flow rate of process gases to a reaction chamber during semiconductor processing. It is generally desirable for the amount of process gas injected into a reaction chamber to be as accurate as possible. Imperfect control over gas flow rates could contribute to non-uniformities in the physical properties of the finished product, or to wasted gas and increased costs.

Embodiments of the present disclosure help verify the accuracy of the measured gas flow through a MFC. In various embodiments, the MFM measures the actual gas flow through an MFC, and that measurement is compared to the MFC's own measurement of the gas flow. If the respective measured flow rates are not the same the flow of gas to the MFC may be adjusted. Preferably, the measured gas flow rate through the MFC is within +/−10% or less, +/−2% or less, +/−1% or less or +/−0.05% or less, of the measured gas flow rate through the MFM. If not within the desirable range, the gas flow to the MFC may be adjusted to be within that range.

Some digital MFCs include a database of flow rates for the active gas and the correlating equivalents in nitrogen gas. By accessing the $N_2$ equivalent table of the MFC one can compare MFC deviations to the $N_2$ flow rate measured by the MFC to the gas flow rate measured by MFV or MFM. The use of a single gas such as nitrogen allows for more accurate comparison since the flows through the MFC and the verification device are output from a common gas, such as $N_2$. The common gas is flowed through the MFC and an MFM for the comparison. A scaling factor is used to compare the $N_2$ flow measured by the MFM to the $N_2$ flow measured by the MFC (which is configured to its own process gas).

The measured gas flow of the MFM can also be verified utilizing any suitable method or device, such as additional MFMs, a mass flow verifier or a restrictor conduit. By entering the common gas flow data into a tabulated format, a scaling factor can be derived at a selected number of points near the gas flow required by the particular process. This step-wise scaling is very accurate for the range of flows required by the process. Most importantly, this scaling can be used by a process controller to calibrate the actual MFC flow rate to the measured MFM gas flow rate. The controller can access the offset table and, if necessary, correct the gas flow of each MFC such that the actual gas flow through each MFC be within a desired range of the measured MFM gas flow.

This process is easily automated, and can be performed quickly and frequently, allowing for tighter control of MFC performance and process repeatability. The fact that this process can be performed more frequently also means it will quickly detect when an MFC is drifting significantly and in need of replacement. A replacement MFC can then be ordered early and be ready for installation at the next scheduled tool maintenance period instead of shutting down the tool solely to replace an MFC, which reduces tool down time.

This detailed description proceeds by describing how the measured flow rate of gas through an MFC is verified using an MFM. It then refers to the drawings to describe exemplary systems according to the disclosure.

Each process gas comes from a different source, such as a tank containing the gas, and is transferred via piping or tubing. Each process gas passes through a different MFC than the other process gases, and is then injected into a tool for manufacturing semiconductors. The MFC regulates the amount of process gas injected into the tool. Each MFC is calibrated for a particular gas and for a particular gas flow rate range required by the fabrication process. As an example, in a semiconductor manufacturing process, depending upon the layers to be deposited on the wafer, each of a plurality of MFCs could be programmed to permit a specific flow of a specific gas into the tool in which a semiconductor is fabricated.

Therefore, the MFC regulates the amount of process gas that enters the tool and is programmed to deliver the amount of gas required for a particular fabrication process. As mentioned previously, the flow rate indicated by MFCs can be incorrect, and it is therefore desirable to utilize systems and methods of the present disclosure to verify that the measured gas flow through the MFC is correct. If it is not correct, then a user has the option to adjust the gas flow to the MFC, or the gas flow could be adjusted automatically.

Some exemplary embodiments may include an MFC that is calibrated to one type of gas (sometimes referred to herein as a second gas) and an MFM that is calibrated to a different type of gas (sometimes referred to herein as a first gas). The second gas to which the MFC is calibrated is usually a process gas used in a tool for manufacturing semiconductors. Such process gases may include, but are not limited to, $SiH_4$, $GeH_4$, $GeH_4/H_2$, $SiHCL_3$, $Si_3H_8$ and $H_2$. The first gas to which the MFM is calibrated is a different gas, usually an inert gas because process gases can corrode the MFM. Some gases for which MFMs are usually calibrated, and that can be used to verify the flow through an MFC, are nitrogen, hydrogen and helium. Nitrogen is most preferred, but any suitable gas could be used. In some embodiments, a single MFM, which is calibrated for a single gas, can be used to verify the accuracy of a plurality of MFCs, wherein each MFC is calibrated for a different process gas.

In embodiments of the present disclosure, the gas for which the MFM is calibrated (the "first gas") is passed through both the MFC and the MFM and a gas flow rate is measured by each. Because the MFC is calibrated to measure the flow of the second gas, not the first gas, its measurement is adjusted according to a scaling factor according to various aspects of the present disclosure. The scaling factor is applied to the measured flow of the first gas through the MFC in order to provide the true measurement of the first gas through the MFC. This true measurement is compared to the gas flow rate measured by the MFM to verify whether it is correct. The scaling factor can be obtained or derived from any suitable source or method. In one preferred embodiment the scaling factor for the process gas flowed through an MFC to $N_2$ is programmed into the MFC and can be retrieved by a software program interfacing with the MFC.

An example of a table showing the results of utilizing a method according to aspects of the present disclosure is reproduced below. This table shows values verified by an MFM for an MFC calibrated for $H_2$ and for a maximum flow of 30 liters per minute:

| MFC 3: N-SRC (3 slm $H_2$) | | | | | | | | |
|---|---|---|---|---|---|---|---|---|
| N2 Equiv | Inlet Prs (MPa) | Set Point | % Setpoint | MFM Prs (T) | MFM | ATM Prs (T) | Δ | % Δ |
| 0.303 | 0.204 | 0.30 | 10.00% | 721 | 0.300 | 725.1 | −0.003 | −1.12% |
| 0.599 | 0.201 | 0.60 | 20.00% | 727 | 0.595 | 725.0 | −0.004 | −0.63% |
| 0.892 | 0.209 | 0.90 | 30.00% | 731 | 0.887 | 725.1 | −0.005 | −0.53% |
| 1.184 | 0.209 | 1.20 | 40.00% | 722 | 1.188 | 725.0 | 0.004 | 0.35% |
| 1.477 | 0.207 | 1.50 | 50.00% | 723 | 1.483 | 724.9 | 0.006 | 0.41% |

-continued

| MFC 3: N-SRC (3 slm H$_2$) | | | | | | | | |
|---|---|---|---|---|---|---|---|---|
| N2 Equiv | Inlet Prs (MPa) | Set Point | % Setpoint | MFM Prs (T) | MFM | ATM Prs (T) | Δ | % Δ |
| 1.770 | 0.206 | 1.80 | 60.00% | 724 | 1.777 | 724.9 | 0.007 | 0.40% |
| 2.066 | 0.205 | 2.10 | 70.00% | 726 | 2.075 | 724.9 | 0.009 | 0.44% |
| 2.366 | 0.204 | 2.40 | 80.00% | 727 | 2.378 | 724.9 | 0.012 | 0.51% |
| 2.674 | 0.203 | 2.70 | 90.00% | 729 | 2.686 | 724.9 | 0.012 | 0.43% |
| 2.995 | 0.202 | 3.00 | 100.00% | 731 | 3.008 | 724.9 | 0.013 | 0.43% |

The first column, designated as "N$_2$ Equivalent," is a programed value resident in the MFC. It is the N$_2$ equivalent flow rate through the MFC when the MFC is adjusted to flow a set amount of process gas.

The second column, designated as "Inlet Prs (MPa)," is an actual measurement of the gas inlet pressure at the MFC. This measurement is not required to practice the embodiments disclosed herein, and is simply used to show that the MFC is being operated at the proper pressure.

The third column, designated as "Set Point," designates a set point on the MFC for the volume of process gas per minute (in this case liters per minute) the MFC is supposed to flow.

The fourth column, marked "% Setpoint," designates the percentage of the MFC full scale set point the Set Point in the third column is. Here, the full scale flow of the MFC is 3 liters per minute of H$_2$, so the first Set Point of 0.300 liters per minute is 10% of the full scale flow.

The fifth column, designated as "MFM Prs (T)," is the inlet pressure to the MFM measured in Torr. The purpose of measuring this is only to show that the MFM is being operated at the proper pressure.

The sixth column, designated as "MFM," is the measured flow of N$_2$ gas through the MFM.

The seventh column, designated as "ATM Prs (T)," is the measured pressure at the outlet of the MFM, and this should be common to all measurements since the outlet is to the exhaust.

The eighth column, designated as "D," (delta) is the difference in the value in the first column subtracted from the value in the sixth column (in the same row). This shows the difference between the actual N$_2$ flow rate measured by the MFM and the intended flow rate for the MFC.

The ninth column, designated as "% D," (% delta) is the percentage of the difference shown in the eighth column.

MFCs operating in conjunction with embodiments of the present disclosure may be configured for any type of gas and any desired flow rate. Preferably, all MFCs are calibrated for a specific range of N$_2$ corresponding to the desired flow range for the MFC. In some embodiments of the present disclosure, a software program interfacing with an MFC can provide a set point (or a percentage of the maximum flow rate for the MFC) and retrieve the N$_2$ equivalent flow rate for the MFC.

For the example described in the table above, the N$_2$ equivalent flow rate for at a set point of 3.00 liters (or 100% of the MFC's maximum flow rate) of H$_2$ is 2.995. Likewise, the N$_2$ equivalent flow rate at a set point of 1.5 liters (or 50% of the MFC's maximum flow rate) is 1.477. Similarly, the MFC's N$_2$ equivalent flow rate at a set point of 0.30 liters (10% the maximum flow rate) is 0.303.

The MFC's intended flow rate at each set point can be compared to a measured value from an MFM, as shown in the eighth column. In the above example, when the MFC reads a flow rate of 2.995, which should correspond to a flow rate of 3.00 liters of H$_2$, the MFM indicates the flow rate is actually 3.008 liters, or a difference of 0.43%. If desired, the flow rate of the MFC may be adjusted such that its actual rate of flow more closely matches the desired flow rate. In many semiconductor processing systems, however, a certain range of inaccuracy from an MFC may be acceptable. In some embodiments, for example, an accepted tolerance for MFC accuracy may be +/−1%. In such cases, the MFC's output for most of the set points in the above example would be acceptable. For the 0.30 liter (10%) set point, however, the MFC is off by −1.12%, which would require an adjustment to the MFC's flow rate in such a scenario. Otherwise, too much or too little of a process gas can lead to defects in the semiconductor devices being fabricated. In accordance with embodiments of this disclosure, adjustments to the MFC's flow rate may be made automatically or manually and at any point during the process.

Adjustment of the input to an MFC may be +/−10% or more as desired to correct for an inaccurate flow rate measured by the MFC. Such adjustment may be performed manually or automatically. In some exemplary embodiments, in response to detecting a flow rate that is inaccurate in excess of a predetermined threshold compared to a flow rate measurement from an MFM results in an automatic adjustment to the input set point to the MFC. Methods operating in conjunction with the embodiments of the present disclosure may generate an alert to an operator of the semiconductor processing tool that an automatic adjustment has been made in response to drift in an MFC, or request confirmation from the operator before adjusting the MFC.

An option to this process is to manifold a single MFM to a cluster set of tools that are served by a common wafer handling platform. There could be 1, 2, 3, 4 or more process tools connected to a common MFM manifold. Thus, a specific type of MFC on one tool could be compared to the same MFC on another tool, and the step wise scaling would thus be to a common referenced MFM. MFM repeatability is much better than its accuracy, typically on the range of +/−0.2%. Thus, matching of various process tool gas performance within a single wafer platform could reduce variation from the typical +/−1% to +/−0.2%, an improvement of 500%. This improved matching would improve wafer yields and save money for manufacturers.

In embodiments of the present disclosure, a "reference" MFM may be moved from platform to platform to perform the step wise scaling routine at each platform. This is a longer process since gas line leak check would be required when the MFM is installed or removed from a system, but would allow platform to platform matching of +/−0.2%. This is a highly desirable improvement and will reduce costs to a semiconductor fabricator across multiple tool sets in their fab.

The creation of the step wise scaling, via accessing the N$_2$ equivalents table in each MFC, and comparing to the MFM flows in N$_2$, can be done manually or automatically. In some exemplary embodiments, these and other processes may be performed by software operating on a computer system, such as system 800 depicted in FIG. 8 and described in more detail below.

Turning now to the figures, where the purpose is to describe exemplary embodiments of the present disclosure and not limit same, FIG. 1 shows a schematic diagram of system 1.

System 1 has a plurality (four) MFCs 2 that can be either connected to (also called in fluid communication with) an MFM 4, which is called the first position, or connected to a tool 4, which is called the second position. It will be understood that when an MFC 2 is in the first position, it individually communicates with the MFM 4 over a given time period because the MFM4 cannot simultaneously verify the measured gas flow rate through a plurality of MFCs 2.

In system 1, a structure of any suitable type, which is referred to herein as a valve, alters the flow of gas exiting an MFC2 to move through either the tool 6 or the MFM4. When the flow of gas moves through the MFM4, the measured flow rate of the MFC2 is verified by the measured flow rate through the MFM4 as described herein. Preferably, gas exiting the MFM4 goes to a suitable exhaust (not shown).

Figure 2:
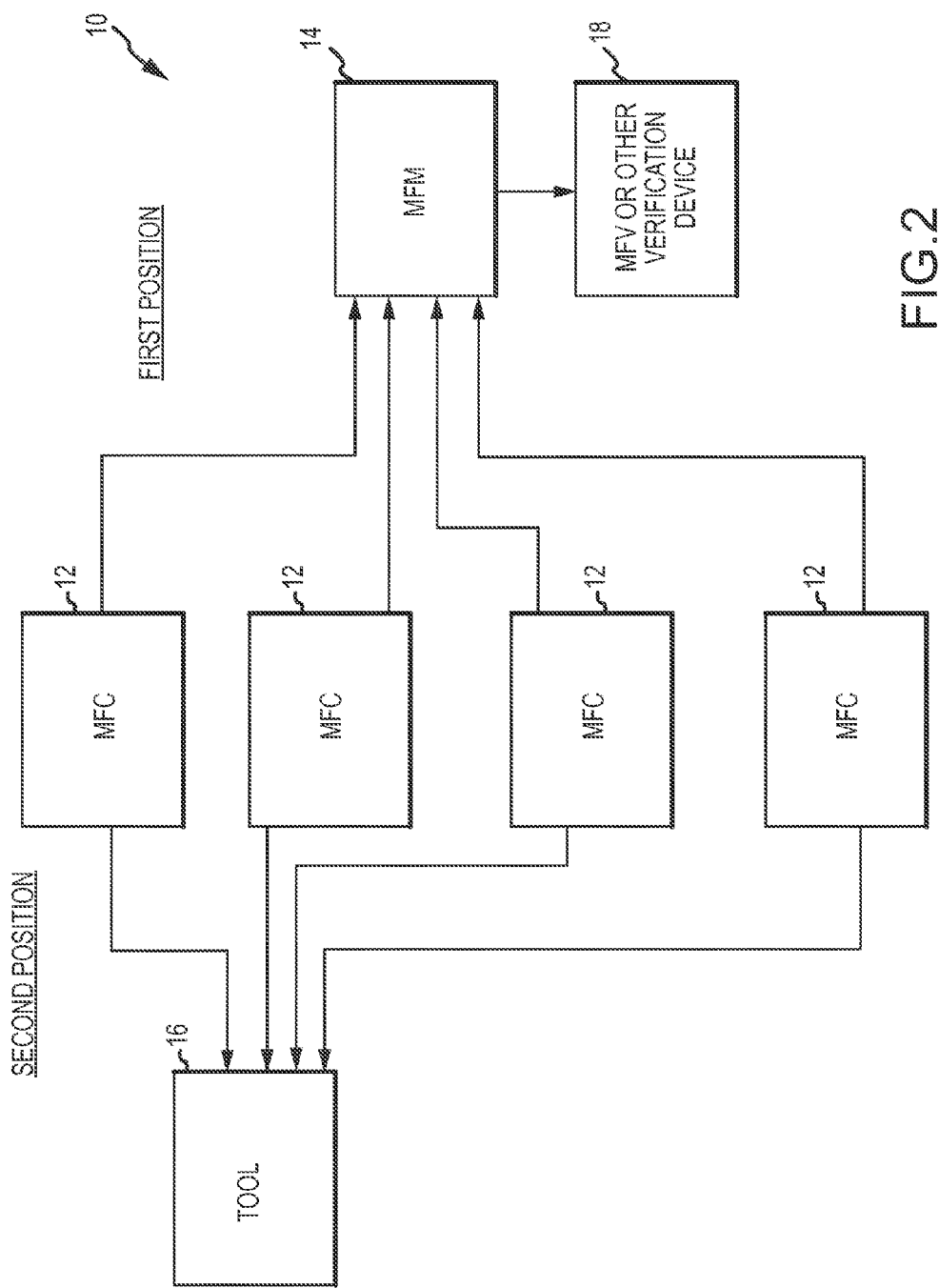
FIG. 2 is a block diagram of an alternate system according to the embodiments of the present disclosure.

FIG. 2 shows an alternate system 10 of the present disclosure that is in all respects the same as system 1. MFCs 12 correspond to MFCs 2, MFM 14 corresponds to MFM 4, and tool 16 corresponds to tool 6. The added structure in system 10 is an MFV or other verification device 18, which verifies the flow rate of gas as measured by MFM 14. Device 18 can be an MFV or a calibration tube, each of which is known by those skilled in the relevant art, but have not been known previously to be used in this manner.

Figure 3:
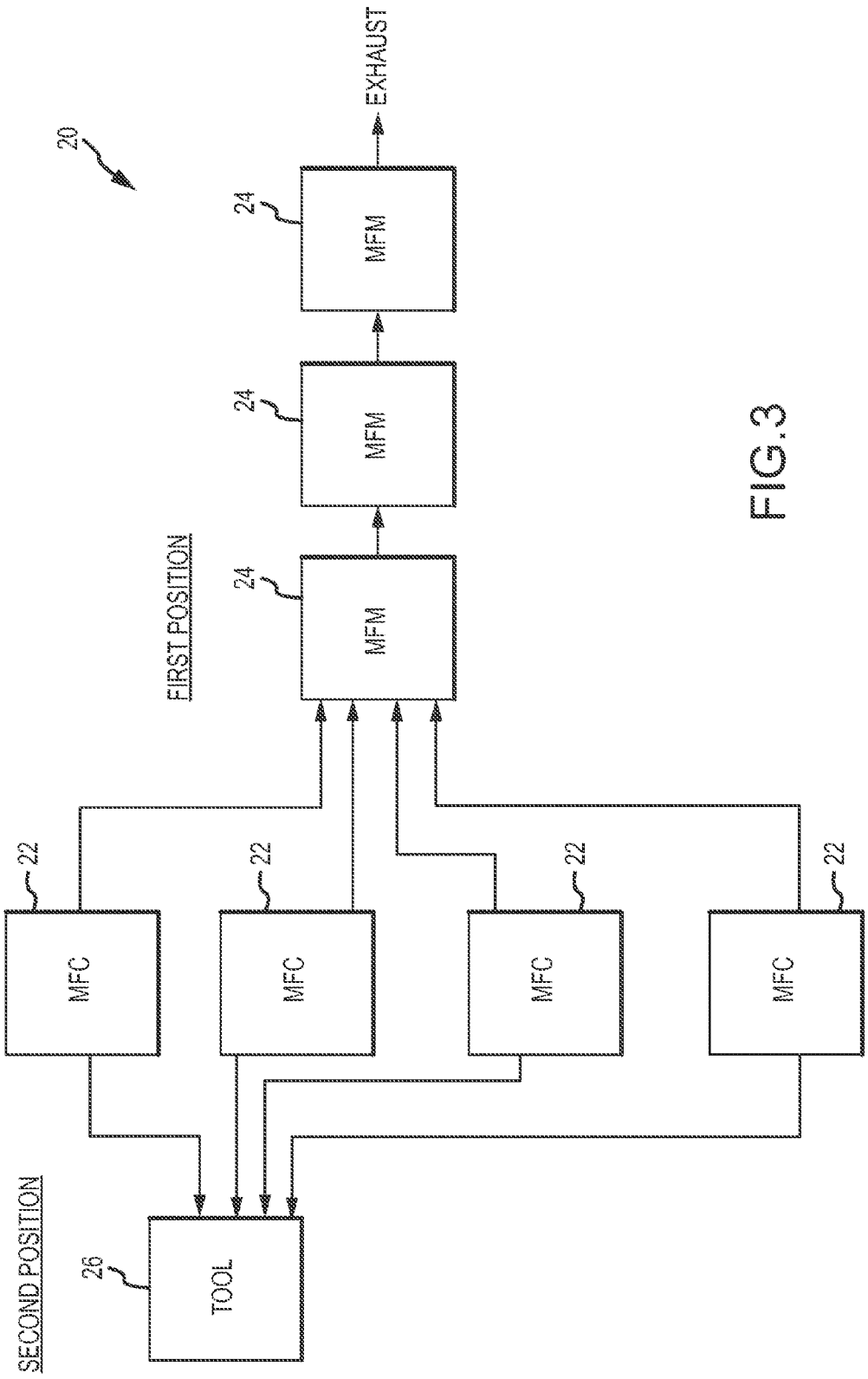
FIG. 3 is a block diagram of an alternate system according to the embodiments of the present disclosure.

FIG. 3 shows an alternate system 20 of the present disclosure. MFCs 22 correspond to MFCs 2, and MFMs 24 correspond to MFMs 4 in system 1. In system 20, there are at least three MFMs 24. When in the first position the gas entering each individual MFC 22 is passed through the plurality of MFMs 24 to verify the measured gas flow rate through the MFC. If one of the MFMs is not functioning properly, its measurement of the gas flow rate will be different than that of the other two (or more) MFMs. In that case, the measured flow rate through the MFC could be verified if two of the three MFMs measure essentially the same flow rate, even though one of the MFMs may measure a different flow rate, and the malfunctioning MFM 24 can be repaired or replaced.

Figure 4:
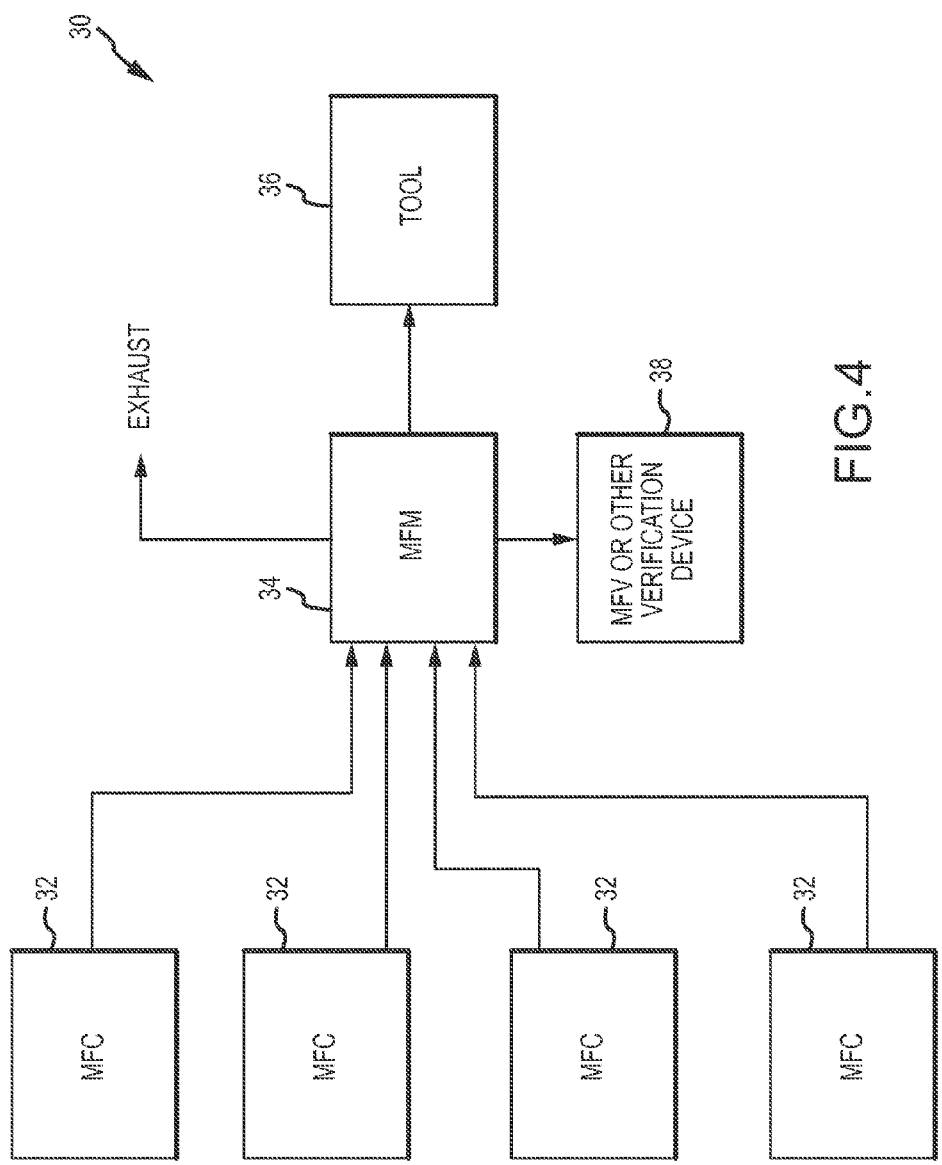
FIG. 4 is a block diagram of an alternate system according to the embodiments of the present disclosure.

FIG. 4 shows a system 30 wherein the MFM 34 is positioned in the gas flow paths that enter tool 36. In this embodiment, MFCs 32 correspond to MFCs 2, MFM 34 corresponds to MFM 4, tool 36 corresponds to tool 6, and MFV 38 corresponds to MFV 18. In this embodiment, MFM is constructed so that it is not easily corroded by the process gases passing through the MFCs 32, and the process gases pass through MFM 34 and into tool 36. When verifying the accuracy of the measured gas flow through any of the MFCs 32, a common gas is used as explained above, and the gas flow exiting MFM 34 is preferably routed to an exhaust rather than into tool 36 (although it could be routed to tool 35, which would later purge the common gas). MFV 38 is, as the other MFVs described herein, an optional feature.

Figure 5:
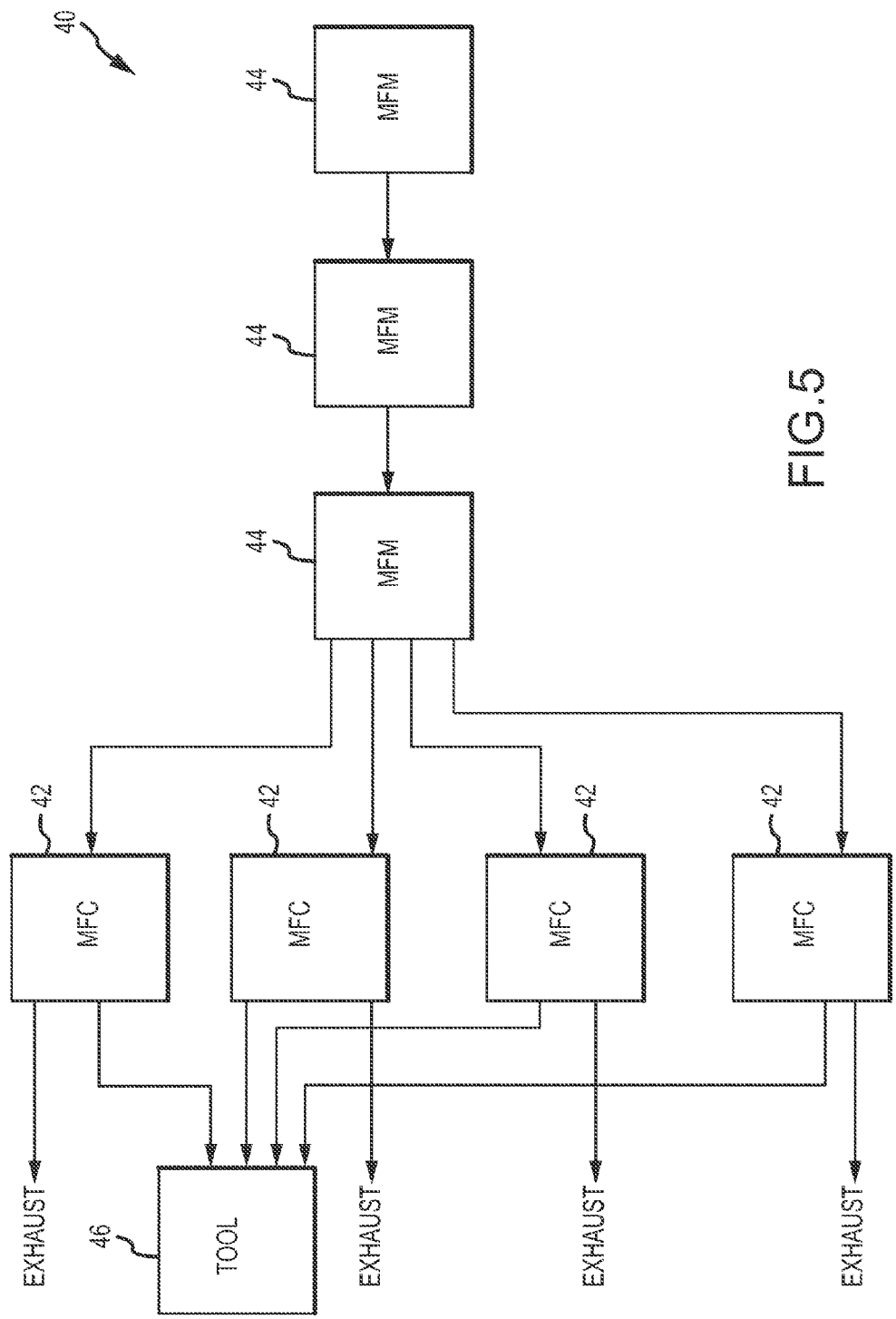
FIG. 5 is a block diagram of an alternate system according to the embodiments of the present disclosure.

FIG. 5 shows an alternate system 40 of the present disclosure wherein there are at least three MFMs 44 upstream of the MFCs 42 and tool 46. In this embodiment each process gas would flow from a source (not shown) through the plurality of MFMs 44 and then be routed from the last MFM 44 to the MFC calibrated for that process gas. These MFMs must be designed and constructed to withstand the corrosive effect of the process gases.

To verify the accuracy of any MFC 42, instead of flowing process gas, another gas such as nitrogen would be flowed through the MFMs 44 and the MFC 42 to be verified. During the verification process, gas exiting the MFC would be routed to an exhaust instead of tool 46.

Figure 6:
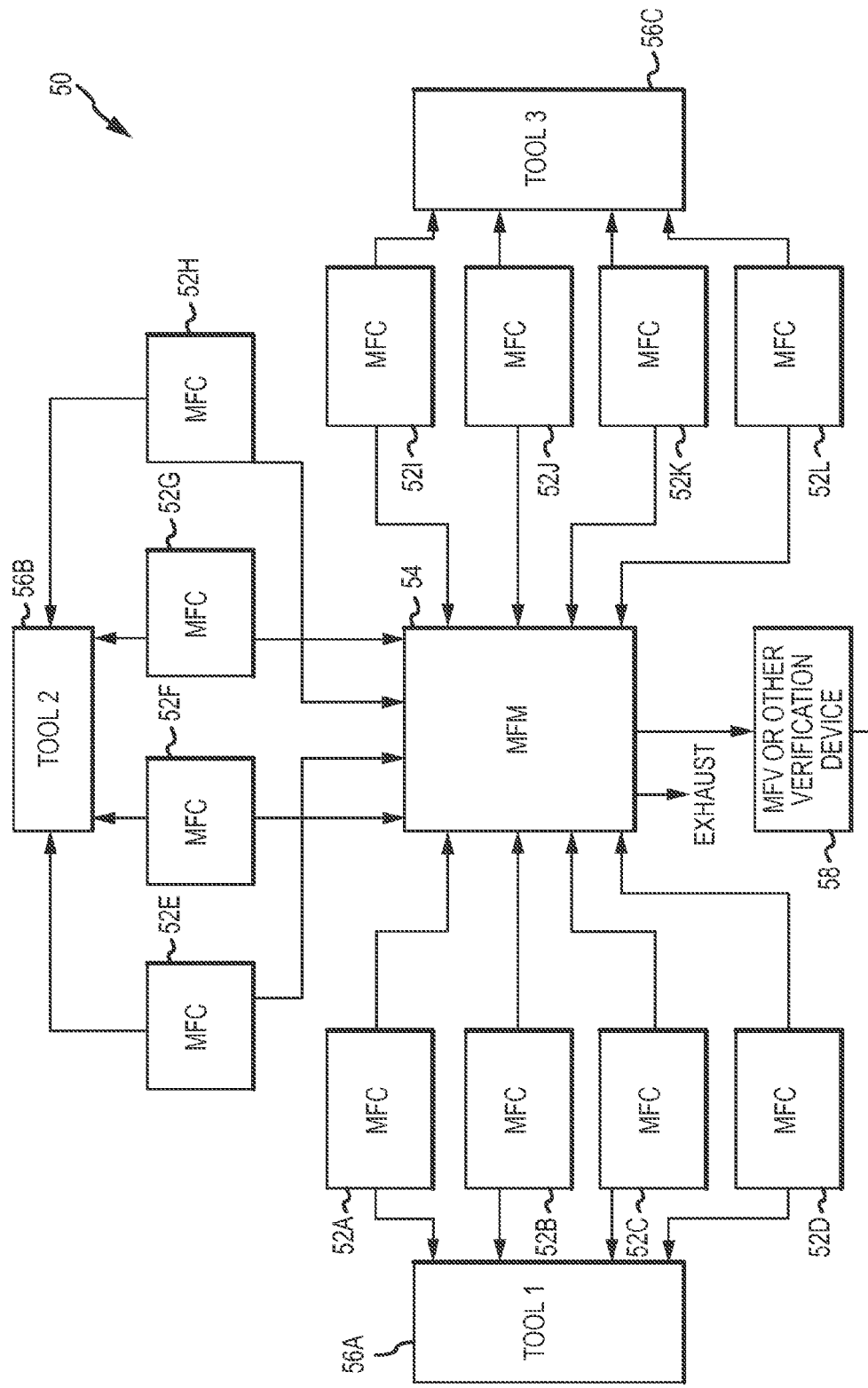
FIG. 6 is a block diagram of an alternate system according to the embodiments of the present disclosure.

FIG. 6 shows an alternate system 50 according to the present disclosure. System 50 has a plurality of tools 56A, 56B and 56C. Each of the plurality of tools has a plurality (four per tool in this embodiment) of MFCs 52A-52L, each of which receive process gas from a source (not shown) and inject the process gas into the associated tool (56A, 56B, or 56C).

In this embodiment there is a single MFM to verify the flow rates of each MFC. As explained herein the flow rate of the MFCs are verified one at a time. System 50 may have a controller that automatically verifies the flow rate of each MFC on a predetermined schedule. As with other embodiments described herein, MFM 54 may be connected to an MFV or other verification device 58 to verify the accuracy of the gas flow rate measured by MFM 54.

Figure 7:
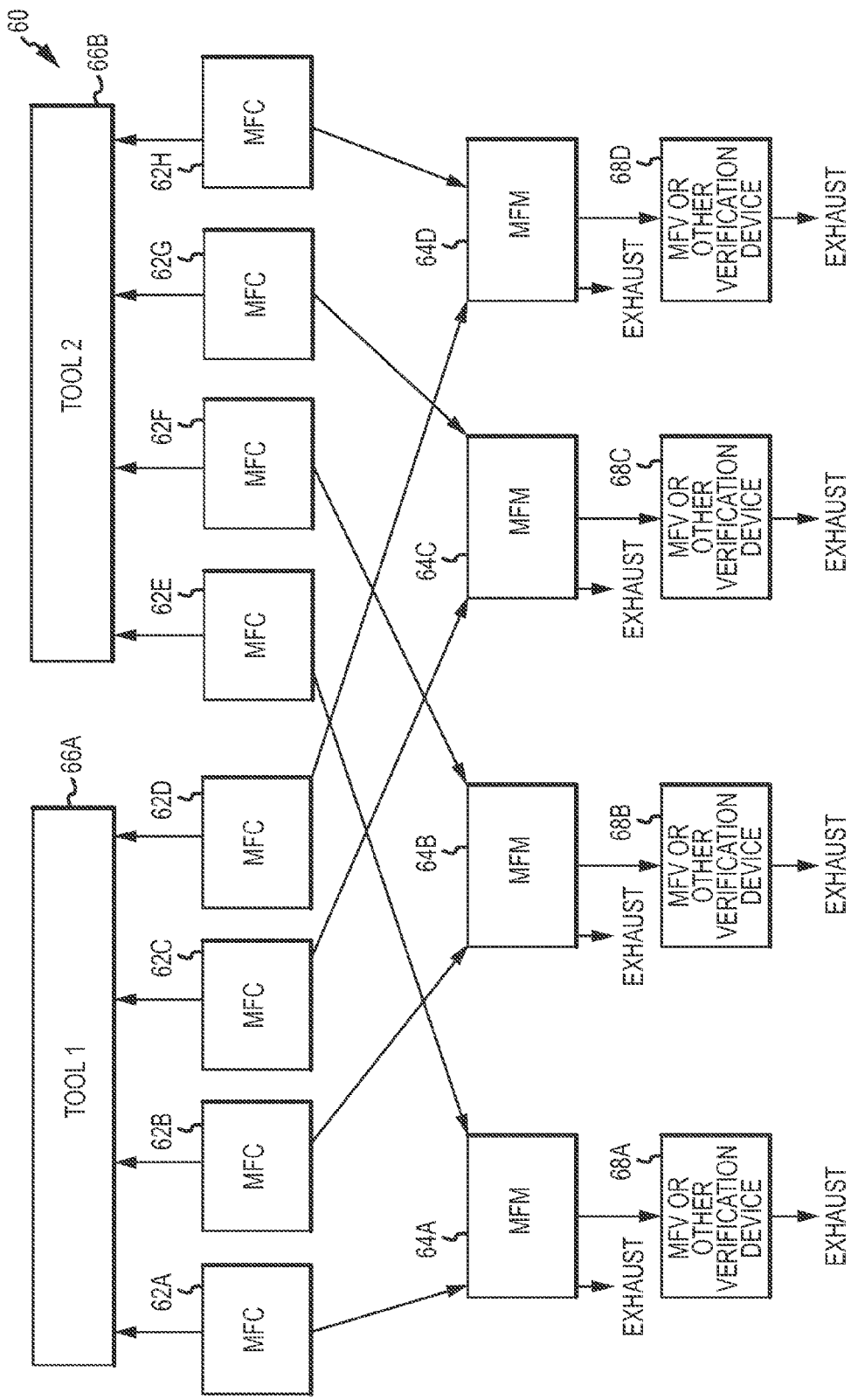
FIG. 7 is a block diagram of an alternate system according to the embodiments of the present disclosure.

FIG. 7 shows an alternate system 60 according to the present disclosure. In system 60 there is a MFM used to verify a plurality of MFCs wherein each MFC associated with an MFM is calibrated for the same gas.

System 60 includes a plurality of tools (two in this example) 66A and 66B. Each of the tools includes a plurality of MFCs, which as shown is four MFCs per tool. System 60 simulates a fabrication shop wherein the same process gases are being injected into each tool. Therefore, MFC 62A and 62E are each calibrated for the same gas, which is a different gas from which the other MFCs are calibrated. MFC 62B and 62F are also calibrated for the same gas, which is a different gas from which the other MFCs are calibrated. MFCs 62C and 62G are calibrated for the same gas, which is a different gas from which the other MFCs are calibrated. Finally, MFCs 62D and 62H are calibrated for the same gas, which is a different gas from which the other MFCs are calibrated.

As shown, each plurality of MFCs calibrated for the same gas have their gas flow rate verified by an MFM (64A-64D) that is not used to verify the gas flow rate of an MFC calibrated for a different gas. Optionally, each MFM can be connected to an MFV or other verification device (68A-68D) to verify the gas flow rate measured by the MFM.

As previously described, to verify the measured gas flow rate through an MFC, which is done one at a time by each MFM, a first gas such as nitrogen is flowed through the MFC and then through the MFM. The verification and potential adjustment is performed as described above.

Figure 8:
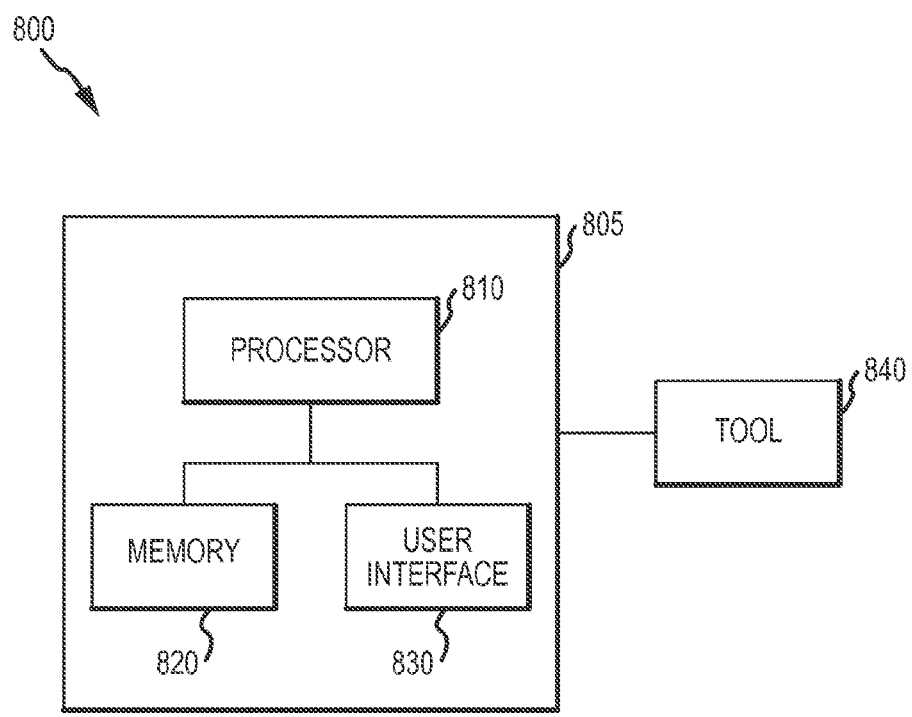
FIG. 8 depicts an exemplary system according to the embodiments of the present disclosure.

FIG. 8 depicts an embodiment of an exemplary system 800 according to various aspects of the present disclosure. In this exemplary embodiment, system 800 includes a computer system 805 comprising a processor 810, memory 820, and user interface 830. The computer system 805 communicates with a semiconductor processing tool 840, which may include any of the semiconductor processing tools described in conjunction with FIGS. 1-7 above.

The computer system 805 may store a software program configured to perform the methods described herein in the memory 820, and run the software program using the processor 810. The computer system 805 may include any number of individual processors 810 and memories 820. Information and commands of any kind may be communicated between the computer system 805 and a user via the user interface 830. Such information may also be communicated between the computer system 805 and the semiconductor processing tool 840 (e.g., through a network such as the Internet).

The computer system 800 may control, or gather information from, any of the components in tool 840, including any MFC or MFM operating in conjunction with embodiments of the present disclosure. The user interface 830 may include various peripheral devices (such as monitors and printers), as well as any suitable control devices (such as a mouse and keyboard) to allow users to control and interact with software operating on the computer system 805. The computer system 805 may include any number of other components, devices, and/or systems.

The particular implementations shown and described above are illustrative of the exemplary embodiments and their best mode and are not intended to otherwise limit the scope of the present disclosure in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the present disclosure. Furthermore, the connecting lines shown in the various figures are intended to represent exemplary functional relationships and/or physical couplings between the various elements. Many alternative or additional functional relationships or physical connections may be present in a practical system.

What is claimed is:

1. A method of verifying the flow rate of gas through a mass flow controller, the method comprising the steps of:
   (a) measuring a flow of a first gas through a mass flow controller that is calibrated for a second gas,
   (b) measuring the actual flow of the first gas through at least three mass flow meters,
      wherein each of a first mass flow meter, a second mass flow meter and a third mass flow meter are calibrated for the first gas,
      wherein the first flow meter is configured to measure a first actual flow, the second flow meter is configured to measure a second actual flow, and the third flow meter is configured to measure a third actual flow;
   (c) comparing the first actual flow, the second actual flow, and the third actual flow to determine a match between at least two of the first actual flow, the second actual flow, and the third actual flow;
   (d) determining a control flow based on the comparing;
   (e) based on the second gas for which the mass flow controller is calibrated, select a scaling factor to apply to the measured flow of the first gas through the mass flow controller;
   (f) scale the measured flow of the first gas through the mass flow controller using the scaling factor to determine a scaled measured flow of the first gas through the mass flow controller;
   (g) compare the scaled measured flow of the first gas through the mass flow controller to the control flow; and
   (h) determine the difference between the scaled measured flow of the first gas through the mass flow controller to the control flow,
      wherein the first gas and the second gas selectively flow through the mass flow meter or to a tool.

2. The method of claim 1 wherein in response to the control flow being different from the scaled measured flow through the mass flow controller and outside a range, the flow of gas sent to the mass flow controller is adjusted.

3. The method of claim 2 wherein the measured flow of gas through the mass flow controller is adjusted to one of the group consisting of: (a) +/−10% or less of the control flow, (b) +/−2% or less of the control flow, (c) +/−1% or less of the control flow; or (d) +/−0.5% of the control flow.

4. The method of claim 1 wherein in response to the difference between the measured flow through the first mass flow controller being different than the control flow, an alert is sent to a user.

5. The method of claim 1 wherein the verification steps are performed for a plurality of scaled measured flow rates for a single mass flow controller.

6. The method of claim 1 wherein the verification steps are performed for a plurality of scaled measured flow rates for each of a plurality of mass flow controllers.

7. The method of claim 1 wherein the scaling factor is programmed into the mass flow controller and is accessed by a user.

8. The method of claim 5 wherein there is a different scaling factor for each gas flow rate.

9. The method of claim 8 wherein each different scaling factor is programmed into the mass flow controller and is accessible to a user.

10. The method of claim 1 wherein the first gas is selected from the group consisting of nitrogen, hydrogen and helium.

11. The method of claim 1 wherein the second gas is selected from the group consisting of: $SiH_4$, $GeH_4$, $GeH_4/H_2$, $SiHCL_3$, $Si_3H_8$ and $H_2$.

12. The method of claim 1 that further includes a mass flow verifier in fluid communication with the mass flow meter and that further includes the step of the mass flow verifier verifying control flow of the first gas that is measured by the plurality of mass flow meters.

13. The method of claim 1 wherein the at least three mass flow meters are in series and in fluid communication, and wherein the first gas exits the mass flow controller and passes through each of the mass flow meters in order to verify the measured flow of first gas passing through the mass flow controller.

14. The method of claim 1 that further includes a calibration tube in fluid communication with the mass flow meter and further comprises the step of directing at least some of the first gas from the mass flow meter through the calibration tube to verify the measured flow of the first gas through the mass flow meter.

15. The method of claim 2 wherein the flow of gas sent to the mass flow controller is adjusted manually by a user.

16. The method of claim 2 wherein the flow of gas to the mass flow controller is adjusted electronically by the mass flow meter sending a signal to a controller.

17. The method of claim 1 that further includes the step of purging the second gas from the mass flow controller prior to verifying the measured flow rate of the first gas through the mass flow controller.

18. The method of claim 1 wherein gas exiting the mass flow controller is re-routed from a tool to the mass flow meter in order to verify the measured flow rate of the first gas through the mass flow controller.

19. The method of claim 1 wherein there is a plurality of mass flow controllers, one of the plurality of mass flow controllers is calibrated for the second gas, and each of the other of the plurality of mass flow controllers is calibrated for a gas other than the first gas, and each of the plurality of mass flow controllers can be individually connected to the mass flow meter to verify the measured flow rate of the first gas through each of the mass flow controllers.

20. The method of claim 18 that further includes the step of the mass flow meter automatically verifying the measured flow of first gas through each of the mass flow controllers on a predetermined time schedule.

21. The method of claim 19 wherein each of the mass flow controllers includes scaling factors and each of the scaling factors is based upon the type of gas regulated by the mass flow controller and the flow rate of the gas through the gas flow controller.

22. The method of claim 1 wherein there is a plurality of mass flow controllers servicing a first tool and a plurality of mass flow controllers servicing a second tool, and the gas flow rate through each of the mass flow controllers is verified by the plurality of mass flow meters.

23. The method of claim 1 that further includes a plurality of tools and a plurality of mass flow controllers associated with each tool, wherein each mass flow controller associated with each tool is calibrated for a gas that is different from the gas for which each other mass flow controller associated with that tool is calibrated, and each of the plurality of tools has at least one mass flow controller calibrated for the same gas as at least one of the plurality of mass flow controllers for another of the plurality of tools is calibrated, and wherein the plurality of mass flow meters verifies the measured flow rates of the first gas through each of the mass flow controllers.

24. The method of claim 1 that further comprises the steps of:
(a) Verifying by the plurality of mass flow meters the flow rate of the first gas through at least one mass flow controller for a first tool; and
(b) Verifying by plurality of mass flow meters the flow rate of the first gas through at least one mass flow controller at a second tool.

25. The method of claim 24 that further comprises the step of physically moving at least one of the plurality of mass flow meters from the first tool to the second tool.

26. A system for verifying the flow rate of gas through a mass flow controller, the system comprising:
(a) a mass flow controller fluidly coupled to a tool, wherein the mass flow controller is calibrated for a second gas and configured to measure the flow rate for a first gas;
(b) a storage device including one or more scaling factors to scale the flow rate of the second gas to a flow rate of a first gas;
(c) a plurality of mass flow meters configured to measure a first actual flow, a second actual flow, and a third actual flow for the first gas flowing therethrough, wherein the mass flow controller is interposed between the mass flow meter and the tool;
(d) a controller configured to compare the first actual flow, the second actual flow, and the third actual flow to determine a match between at least two of the first actual flow, the second actual flow, and the third actual flow, the controller configured to determine a control flow based on the match; and
(e) a valve having a first position wherein gas exiting the mass flow controller is directed through the plurality of mass flow meters and a second position wherein gas exiting the mass flow controller is not directed through the plurality of mass flow meters,
whereby when the valve is in its first position the measured amount of first gas flow rate through the mass flow controller can be verified by utilizing the scaling factor and comparing the control flow from the plurality of mass flow meters.

27. The system of claim 26 that further includes a gas flow verification device connected to the plurality of mass flow meters to verify that the control flow measured through the plurality of mass flow meters is correct.

28. The system of claim 26 wherein the gas flow verification device is selected from the group consisting of: a mass flow verifier and a calibration tube.

29. The system of claim 26 wherein there is a plurality of mass flow controllers, and gas from only one mass flow controller is directed through the plurality of mass flow meters at any given time.

30. The system of claim 26 wherein when the valve is in its second position, gas exiting the mass flow controller enters a tool for making semiconductors or solar cells.

31. The system of claim 26 that further includes an automated system for adjusting the gas flow to the mass flow controller if there is a predetermined difference between the measured amount of gas flow through the mass flow controller and the control flow.

32. The system of claim 26 wherein there is a plurality of mass flow controllers servicing a first tool and a plurality of mass flow controllers servicing a second tool, and the gas flow rate through each of the mass flow controllers is verified by the plurality of mass flow meters.

33. The system of claim 26 that further includes a plurality of tools and a plurality of mass flow controllers associated with each tool, wherein each mass flow controller associated with each tool is calibrated for a gas that is different from the gas for which each other mass flow controller associated with that tool is calibrated, and each of the plurality of tools has at least one mass flow controller calibrated for the same gas as at least one of the plurality of mass flow controllers for another of the plurality of tools is calibrated, and wherein the plurality of mass flow meters verifies the measured flow rates of the first gas through each of the mass flow controllers that is calibrated for the same gas.

34. A system for verifying the flow rate of gases, the system comprising:
a first tool;
a first mass flow controller in fluid communication with the first tool,
wherein the first mass flow controller is calibrated for a second gas;
a mass flow meter in fluid communication with the first mass flow controller,
wherein the mass flow meter is calibrated for a first gas;
a second tool;
a second mass flow controller in fluid communication with the second tool and the mass flow meter,
wherein the second mass flow controller is calibrated for the second gas;
the mass flow meter is configured to determine and compare an actual flow rate of the first gas from the first mass flow controller and the second mass flow controller; and
a controller configured to determine at least one of a control flow or a scaling factor based on the actual flow rate of the first gas from the first mass flow controller and the second mass flow controller.

* * * * *